US012565933B1

(12) United States Patent

Gramlich et al.

(10) Patent No.: US 12,565,933 B1

(45) Date of Patent: Mar. 3, 2026

(54) CONCENTRIC VALVE SKIRTS

(71) Applicant: Bestway Oilfield, Inc., Channelview, TX (US)

(72) Inventors: Don Channing Gramlich, Richmond, TX (US); Mehul Jain, Humble, TX (US)

(73) Assignee: Bestway Oilfield, Inc., Channelview, TX (US)

( * ) Notice: Subject to any disclaimer, the term of this patent is extended or adjusted under 35 U.S.C. 154(b) by 0 days.

(21) Appl. No.: 19/247,186

(22) Filed: Jun. 24, 2025

Related U.S. Application Data

(60) Provisional application No. 63/689,575, filed on Aug. 30, 2024.

(51) Int. Cl.
  *F16K 3/20* (2006.01)
  *F16K 3/02* (2006.01)
  *F16K 3/36* (2006.01)
(52) U.S. Cl.
  CPC .............. *F16K 3/20* (2013.01); *F16K 3/0227* (2013.01); *F16K 3/36* (2013.01)
(58) Field of Classification Search
  CPC ............. F16K 3/20; F16K 3/0227; F16K 3/36
  USPC ................................. 251/355, 193, 195–202
  See application file for complete search history.

(56) References Cited

U.S. PATENT DOCUMENTS

| | | |
|---|---|---|
| 1,708,851 A | 4/1929 | Sparks |
| 1,752,657 A | 4/1930 | Sparks |

| | | |
|---|---|---|
| 2,030,458 A | 2/1936 | Mckellar et al. |
| 2,063,655 A | 12/1936 | Barner |
| 2,150,887 A | 3/1939 | Mueller et al. |
| 2,356,630 A | 8/1944 | Strecker |
| 2,359,741 A | 10/1944 | Venton et al. |
| 2,520,364 A | 8/1950 | Hobbs |
| 2,766,829 A | 10/1956 | Watts et al. |
| 2,815,187 A | 12/1957 | Hamer |
| 2,977,975 A | 4/1961 | Allen |

(Continued)

FOREIGN PATENT DOCUMENTS

| | | |
|---|---|---|
| CA | 2638434 A1 | 1/2010 |
| CN | 201902656 U | 7/2011 |

(Continued)

OTHER PUBLICATIONS

International Search Report and Written Opinion received in Patent Cooperation Treaty Application No. PCT/US2025/024618, dated Jun. 5, 2025, 10 pages.

(Continued)

*Primary Examiner* — John Bastianelli

(74) *Attorney, Agent, or Firm* — Johnston IP Law, PLLC

(57) ABSTRACT

A gate valve includes a valve body having a through-bore and a gate cavity, a gate disposed within the gate cavity, an annular seat pocket formed within the valve body, an annular seat disposed within the annular seat pocket, and a skirt disposed within the gate cavity and in contact with the annular seat and in contact with the surface of the gate. The skirt has an annular opening that is concentric with the annular seat and is sized and configured so that an outer edge of the annular seat abuts with an inner edge of the annular opening. The skirt may be suspended by the seat within the gate cavity. The skirt may reduce or prevent fluid exchange between a lubricant cavity formed within the valve body and an opening formed within the gate or with the through-bore.

20 Claims, 13 Drawing Sheets

(56) References Cited

U.S. PATENT DOCUMENTS

| | | | |
|---|---|---|---|
| 3,001,183 A | 9/1961 | Mckenney et al. |
| 3,083,945 A | 4/1963 | Shafer et al. |
| 3,095,004 A | 6/1963 | Jackson, Jr. et al. |
| 3,347,261 A | 10/1967 | Yancey |
| 3,412,748 A | 11/1968 | Volpin |
| 3,541,430 A | 11/1970 | Luger |
| 3,556,472 A | 1/1971 | Grove et al. |
| 3,696,831 A | 10/1972 | Fowler et al. |
| 3,768,774 A | 10/1973 | Baugh |
| 3,827,673 A | 8/1974 | Houlgrave et al. |
| 3,965,987 A | 6/1976 | Biffle |
| 4,208,035 A | 6/1980 | Alvarez et al. |
| 4,245,661 A | 1/1981 | McGee |
| 4,281,819 A | 8/1981 | Linder |
| 4,390,186 A | 6/1983 | McGee et al. |
| 4,440,404 A | 4/1984 | Roach et al. |
| 4,471,943 A | 9/1984 | Nelson |
| 4,572,298 A | 2/1986 | Weston |
| 4,652,022 A | 3/1987 | Nichols |
| 4,823,882 A | 4/1989 | Stokley et al. |
| 4,867,254 A | 9/1989 | Gavignet |
| 4,925,154 A | 5/1990 | Baker |
| 4,926,903 A | 5/1990 | Kawai |
| 5,180,173 A | 1/1993 | Kimura et al. |
| 5,205,356 A | 4/1993 | Bridges et al. |
| 5,341,835 A | 8/1994 | Lanning, II |
| D352,094 S | 11/1994 | Baker |
| 5,377,955 A | 1/1995 | Baker |
| 5,394,943 A | 3/1995 | Harrington |
| 5,540,282 A | 7/1996 | Dallas |
| 5,743,335 A | 4/1998 | Bussear |
| 5,787,075 A | 7/1998 | Uchida |
| 6,176,466 B1 | 1/2001 | Lam et al. |
| D440,283 S | 4/2001 | Cain et al. |
| 6,257,276 B1 | 7/2001 | Muller et al. |
| 6,360,822 B1 | 3/2002 | Robertson |
| 6,364,024 B1 | 4/2002 | Dallas |
| 6,425,413 B2 | 7/2002 | Davis et al. |
| 6,454,015 B1 | 9/2002 | Armstrong et al. |
| 6,659,419 B2 | 12/2003 | Chatufale |
| 6,975,103 B1 | 12/2005 | Blom |
| 7,069,987 B2 | 7/2006 | Kwasniewski et al. |
| D527,077 S | 8/2006 | Chen |
| D529,587 S | 10/2006 | Chen |
| 7,140,445 B2 | 11/2006 | Shahin et al. |
| 7,150,326 B2 | 12/2006 | Bishop et al. |
| 7,299,880 B2 | 11/2007 | Logiudice et al. |
| 7,306,201 B2 | 12/2007 | Lam |
| 7,308,934 B2 | 12/2007 | Swagerty et al. |
| 7,311,148 B2 | 12/2007 | Giroux et al. |
| 7,614,448 B2 | 11/2009 | Swagerty et al. |
| 7,644,772 B2 | 1/2010 | Avant et al. |
| 8,327,943 B2 | 12/2012 | Borak et al. |
| 8,360,095 B2 | 1/2013 | Morgan et al. |
| D690,395 S | 9/2013 | Altmannsberger |
| 8,950,485 B2 | 2/2015 | Wilkins et al. |
| 9,004,091 B2 | 4/2015 | Joseph et al. |
| 9,181,778 B2 | 11/2015 | Hurtado et al. |
| 9,347,289 B2 | 5/2016 | Judge et al. |
| 9,453,578 B2 | 9/2016 | Sundararajan |
| 9,624,754 B2 | 4/2017 | Merron et al. |
| 9,759,334 B2 | 9/2017 | Hunter et al. |
| 9,759,347 B2 | 9/2017 | Elliott |
| 9,850,740 B2 | 12/2017 | Atencio |
| 9,879,507 B2 | 1/2018 | Gilstad et al. |
| 9,885,420 B2 | 2/2018 | Sundararajan |
| 10,060,548 B1 | 8/2018 | Oak |
| 10,094,366 B2 | 10/2018 | Marica |
| 10,174,848 B2 | 1/2019 | Sundararajan |
| 10,233,721 B2 | 3/2019 | Hoang et al. |
| 10,451,187 B2 | 10/2019 | Roberts |
| 10,494,898 B2 | 12/2019 | Kajaria et al. |
| 10,508,744 B2 | 12/2019 | Roberts |
| 10,662,749 B1 | 5/2020 | Hill et al. |
| 10,663,068 B2 | 5/2020 | Puranik et al. |
| 10,677,360 B2 | 6/2020 | Sundararajan |
| 10,895,139 B2 | 1/2021 | Sizemore et al. |
| 11,009,419 B2 | 5/2021 | Kalimuthu et al. |
| 11,105,426 B2 | 8/2021 | Roberts |
| 11,125,341 B2 | 9/2021 | Sundararajan |
| 11,131,393 B2 | 9/2021 | Sundararajan |
| 11,149,513 B2 | 10/2021 | Scott |
| 11,435,001 B2 | 9/2022 | Kalimuthu |
| 11,549,594 B2 | 1/2023 | Sundararajan |
| 11,624,444 B2 | 4/2023 | Kalimuthu |
| 11,644,105 B2 | 5/2023 | Sundararajan |
| 11,746,632 B2 | 9/2023 | Scott |
| 12,013,046 B2 | 6/2024 | Sundararajan |
| 12,110,979 B1 | 10/2024 | Horvath et al. |
| 12,110,980 B2 | 10/2024 | Roberts |
| 12,287,041 B1 | 4/2025 | Gramlich et al. |
| 2003/0015681 A1 | 1/2003 | Chatufale |
| 2004/0040746 A1 | 3/2004 | Niedermayr et al. |
| 2004/0238177 A1 | 12/2004 | Fossli |
| 2010/0012328 A1 | 1/2010 | Nikirofuk |
| 2011/0083852 A1 | 4/2011 | Bertrand |
| 2011/0108275 A1 | 5/2011 | Borak et al. |
| 2012/0012341 A1 | 1/2012 | White et al. |
| 2012/0223267 A1 | 9/2012 | Marica |
| 2013/0277589 A1 | 10/2013 | Vaughan |
| 2014/0326038 A1 | 11/2014 | Fauveau |
| 2015/0090342 A1 | 4/2015 | Cartwright et al. |
| 2015/0315869 A1 | 11/2015 | Landry |
| 2016/0040802 A1 | 2/2016 | Clark et al. |
| 2016/0123099 A1 | 5/2016 | Kapavarapu et al. |
| 2016/0232997 A1 | 8/2016 | Kim et al. |
| 2016/0291609 A1 | 10/2016 | Lucas et al. |
| 2017/0191350 A1 | 7/2017 | Johns et al. |
| 2017/0191570 A1 | 7/2017 | Roberts |
| 2018/0283138 A1 | 10/2018 | Peyregne et al. |
| 2019/0010781 A1 | 1/2019 | Tran |
| 2019/0277409 A1 | 9/2019 | Puranik et al. |
| 2019/0346048 A1 | 11/2019 | Harrel et al. |
| 2019/0391028 A1 | 12/2019 | Kalimuthu et al. |
| 2020/0240537 A1 | 7/2020 | Moseley et al. |
| 2020/0355321 A1 | 11/2020 | Zerkus et al. |
| 2021/0025505 A1 | 1/2021 | Vijay |
| 2021/0215255 A1 | 7/2021 | Kalimuthu |
| 2022/0074502 A1 | 3/2022 | Roberts |
| 2022/0397201 A1 | 12/2022 | Kalimuthu |
| 2023/0003305 A1 | 1/2023 | Gavela et al. |
| 2023/0031393 A1 | 2/2023 | Kalimuthu |
| 2023/0228332 A1 | 7/2023 | Sundararajan |
| 2023/0272860 A1 | 8/2023 | Sundararajan |
| 2024/0077147 A1 | 3/2024 | Duncan et al. |
| 2024/0200667 A1 | 6/2024 | Kalimuthu |
| 2025/0075803 A1 | 3/2025 | Gramlich et al. |
| 2025/0129854 A1 | 4/2025 | Gramlich et al. |
| 2025/0224036 A1 | 7/2025 | Gramlich et al. |

FOREIGN PATENT DOCUMENTS

| | | | |
|---|---|---|---|
| CN | 201963923 U | 9/2011 |
| CN | 202252053 U | 5/2012 |
| CN | 202927097 U | 5/2013 |
| CN | 203051805 U | 7/2013 |
| CN | 203670846 U | 6/2014 |
| CN | 204164393 U | 2/2015 |
| CN | 108138735 A | 6/2018 |
| EP | 0567913 A1 | 11/1993 |
| EP | 0597177 A1 | 5/1994 |
| EP | 3292329 A1 | 3/2018 |
| EP | 2976559 B1 | 1/2020 |
| EP | 3670977 A1 | 6/2020 |
| EP | 3889477 A1 | 10/2021 |
| EP | 3982018 A1 | 4/2022 |
| GB | 2272271 B | 5/1994 |
| WO | 2004008009 A1 | 1/2004 |

(56) References Cited

FOREIGN PATENT DOCUMENTS

| | | | |
|---|---|---|---|
| WO | 2015163246 | A1 | 10/2015 |
| WO | 2016073666 | A1 | 5/2016 |

OTHER PUBLICATIONS

International Search Report and Written Opinion received in Patent Cooperation Treaty Application No. PCT/US2025/024979, dated Aug. 6, 2025, 12 pages.
International Search Report and Written Opinion received in Patent Cooperation Treaty Application No. PCT/US2025/035004, dated Sep. 9, 2025, 13 pages.
International Search Report and Written Opinion received in Patent Cooperation Treaty Application No. PCT/US2025/035023, dated Aug. 28, 2025, 15 pages.

CONCENTRIC VALVE SKIRTS

RELATED APPLICATION

This application claims the benefit of U.S. Provisional Patent Application No. 63/689,575, filed on Aug. 30, 2024, entitled, "Concentric Valve Skirts" the disclosure of which is hereby incorporated by reference for all purposes.

TECHNICAL FIELD

This application is directed, in general, to valves for use in fluid transfer applications, and more specifically to concentric valve skirts, which may be used in oil and gas applications.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

Gate valves are used to control the transfer of fluids in tubing and pipelines. Specifically, gate valves are used to stop and start the flow of fluids in a downstream direction or upstream. Gate valves are commonly used in the oil and gas industry to control the flow of various fluids such as production fluids, water, fracking fluids, and other fluids used in drilling, operating, and maintaining oil and gas wells.

Gate valves generally operate by actuation of an internal gate, which in one position has an opening to allow upstream fluids to flow through the valve and in a downstream direction and a second position which blocks flow through the valve thereby preventing transfer of fluid in a downstream direction. While gate valves have been in existence for a long time, improvements are still desired.

SUMMARY

In one embodiment, a gate valve includes a valve body, a gate disposed within the gate cavity, an annular seat pocket formed within the valve body proximate to the intersection of the through-bore and the gate cavity and concentric with the through-bore, an annular seat disposed within the annular seat pocket, the annular seat being concentric with the through-bore, and a skirt. A surface of the seat is in contact with a surface of the gate when the gate is in the closed position so that a substantial fluid seal is formed between the surface of the seat and the surface of the gate. The skirt is disposed within the gate cavity and in contact with the annular seat and in contact with the surface of the gate. The valve body is formed with a through-bore and a gate cavity therethrough, and the through-bore and the gate cavity intersect and are substantially orthogonal to each other. The gate is operable to translate along a length of the gate cavity to move between an open position and a closed position. When the gate is in the closed position the gate substantially blocks fluid flow through the through-bore, and when the gate is in the open position the gate does not substantially block fluid flow through the through-bore. The skirt comprises an annular ring portion, the annular ring portion having an annular opening that is concentric with the annular seat and is sized and configured so that an outer edge of the annular seat abuts with an inner edge of the annular opening.

In one embodiment, a gate valve includes a valve body, a gate disposed within the gate cavity, a first stem disposed within the gate cavity and connected to a first end of the gate, a second stem disposed with the gate cavity and connected to a second end of the gate, an annular seat pocket formed within the valve body proximate to the intersection of the through-bore and the gate cavity and concentric with the through-bore, an annular seat disposed within the annular seat pocket, the annular seat being concentric with the through-bore, and a skirt. The valve body is formed with a through-bore therethrough and a gate cavity. The through-bore and the gate cavity intersect and are orthogonal to each other. The gate is operable to translate along a length of the gate cavity to move between an open position and a closed position. When the gate is in the closed position the gate substantially blocks fluid flow through the through-bore, and when the gate is in the open position the gate does not substantially block fluid flow through the through-bore. A surface of the seat is in contact with a surface of the gate when the gate is in the closed position so that a substantial fluid seal is formed between the surface of the seat and the surface of the gate. The skirt has a proximate portion, a middle portion, and a distal portion. The middle portion has an opening sized and configured so that an outer edge of the annular seat mates and conforms with an inner edge of the opening of the middle portion of the skirt. The proximate portion extends into a first lubricant pocket formed within the valve body, and the distal portion extends into a second lubricant pocket formed within the valve body. When the gate is in the closed position, the distal portion contacts the gate to substantially prevent fluid flow between an opening in the gate and the second lubricant pocket.

In one embodiment, A slab gate valve includes a valve body formed with a through-bore in a first direction and formed with a gate cavity in a second direction orthogonal to the first direction, a slab gate having a first portion and a second portion, at least one stem coupled to the slab gate for selectively moving the slab gate between the open position and the closed position, a seat at least partially disposed within a seat pocket formed in the valve body proximate to an intersection of the through-bore and the gate cavity, a downstroke lubricant cavity formed in a portion of the valve body, and a skirt disposed adjacent to the slab gate and at least between the slab gate and the downstroke lubricant cavity. The gate cavity is sized and configured to receive the slab gate. The first portion of the slab gate is sized and configured to occlude the through-bore when the slab gate is in a closed position. The second portion of the slab gate is formed with a flow aperture for allowing flow therethrough when the slab gate is in an open position. A side of the seat contacts a side of the gate when the slab gate is in the closed position to form a substantial fluid seal between the seat and the gate. The skirt has an opening sized and configured to receive outer edge of the seat whereby the skirt is suspended within the gate cavity by the seat.

Other embodiments are disclosed.

DESCRIPTION OF THE DRAWINGS

Illustrative embodiments of the present disclosure are described in detail below with reference to the attached drawing figures, which are incorporated by reference herein and wherein.

DETAILED DESCRIPTION

Figure 1:
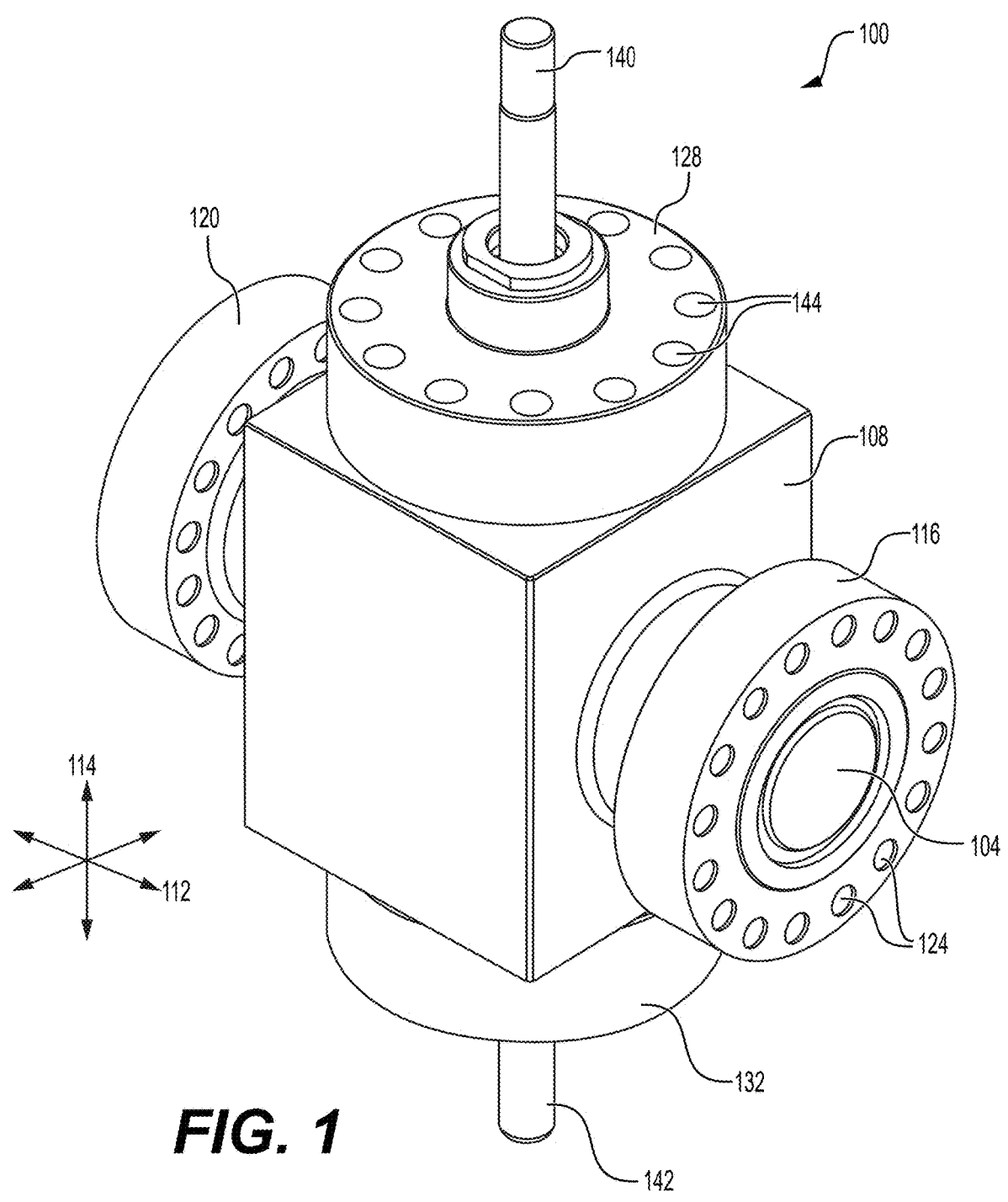
FIG. 1 is a schematic, perspective view of an illustrative embodiment of a slab gate valve with a concentric valve skirt.

In the following detailed description of the preferred embodiments, reference is made to the accompanying drawings that form a part hereof, and in which is shown, by way of illustration, specific embodiments in which the disclosure may be practiced. These embodiments are described in sufficient detail to enable those skilled in the art to practice the disclosure, and it is understood that other embodiments may be utilized, and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense, and the scope of the present disclosure is defined only by the claims. Unless otherwise indicated, as used throughout this document "or" does not require mutual exclusivity.

In one illustrative embodiment, a gate valve has a valve body with a through-bore running the length of the gate valve. The through-bore being, typically, of circular cross section. The ends of the gate valve are connected to upstream and downstream tubulars, with fluid entering the gate valve from the upstream side and exiting the gate valve from the downstream side.

Flow is opened or closed by a gate. The gate is generally a slab with an opening in one area and a solid surface in another area. The gate resides within a gate cavity which bisects the through-bore and is able to be moved from an open position, in which the opening of the gate is in line with the through-bore, and a closed position, in which the solid surface of the gate blocks flow through the through-bore. In some applications, the gate valve may take a plurality of intermediate positions and constrain flow as a throttle valve.

The gate may be a dynamic gate that can translate a distance in the direction of the through-bore in response to fluid pressures exerted against the gate surface. The concentric skirt, which provides a seal between fluid flow areas of the valve and lubricated areas (or lubricated reservoirs or cavities) of the valve, may be a dynamic concentric skirt. The skirt, therefore, whether dynamic or not, reduces cross-flow between through-bore fluids and lubricants, thereby reducing contamination of lubricants and loss of lubricants. A dynamic concentric skirt is biased by a skirt energizer, so that the dynamic concentric skirt is biased toward the gate to achieve a seal with a gate surface or the surface of an upper or lower stem attached to the gate and to move in response to gate movement. A seal may be complete or partial.

The gate valve includes a seat, which provides a seal between the gate and the through-bore to prevent through-bore fluid from flowing into lubricated areas of the valve. Part of the seal formed by the seat includes contact of a seat surface with the gate, which prevents through-bore fluid from flowing into lubrication areas. The seat may be dynamic. When the seat is dynamic, the seat is biased by an energizer toward the gate surface to increase the quality of this seal. In addition, the biasing force of the energizer results in movement of the seat toward the gate as the gate translates in the direction of the through-bore. Thereby, the seat dynamically moves with the movement of the gate, which moves in response to fluid pressures, to maintain the seal between the seat and the gate. The concentric skirt may also be used with seats that are not dynamic.

Figure 2:
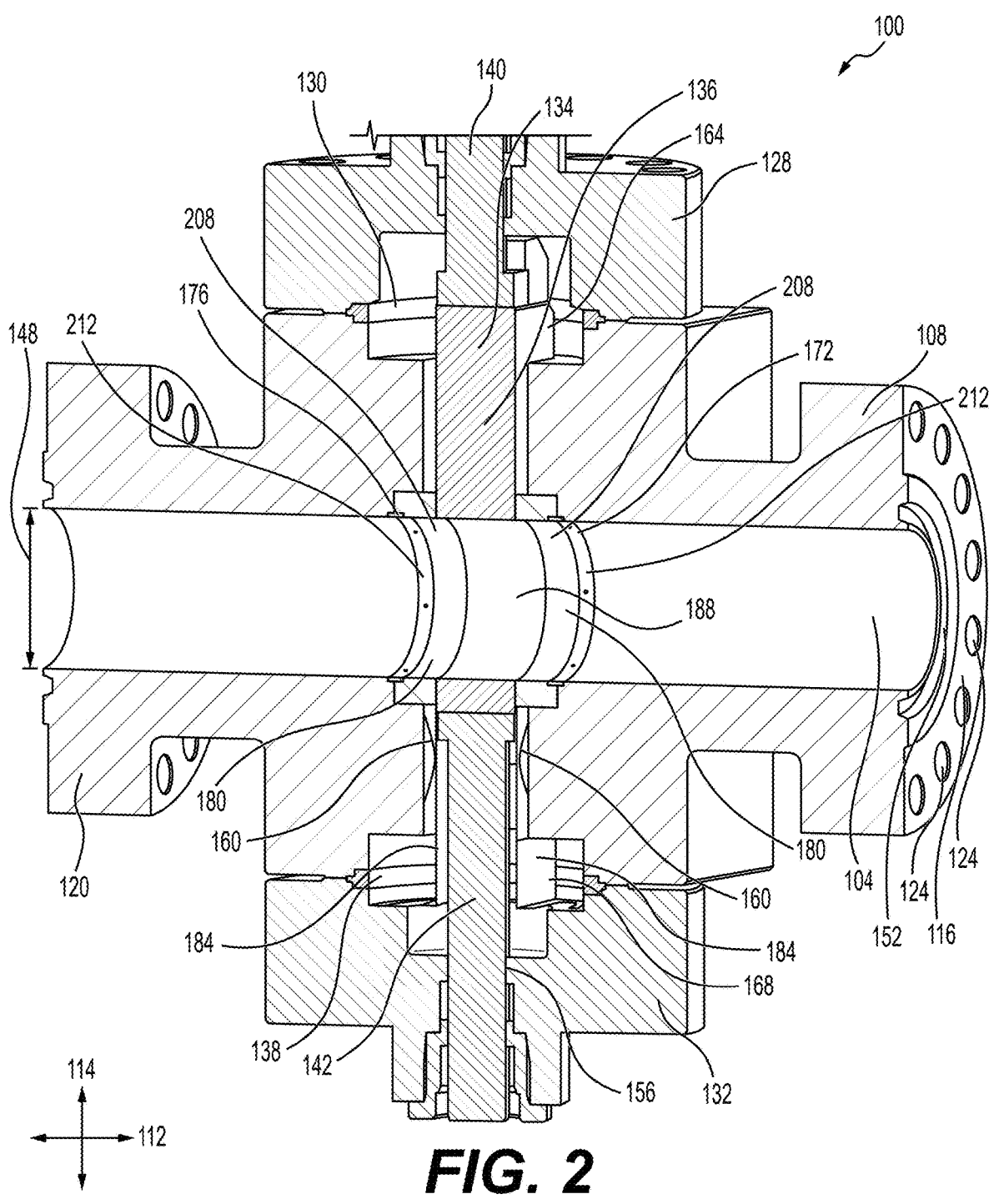
FIG. 2 is a schematic, perspective view with a portion shown in cross section of an illustrative embodiment of a dynamic slab gate valve with a valve skirt.
Figure 3:
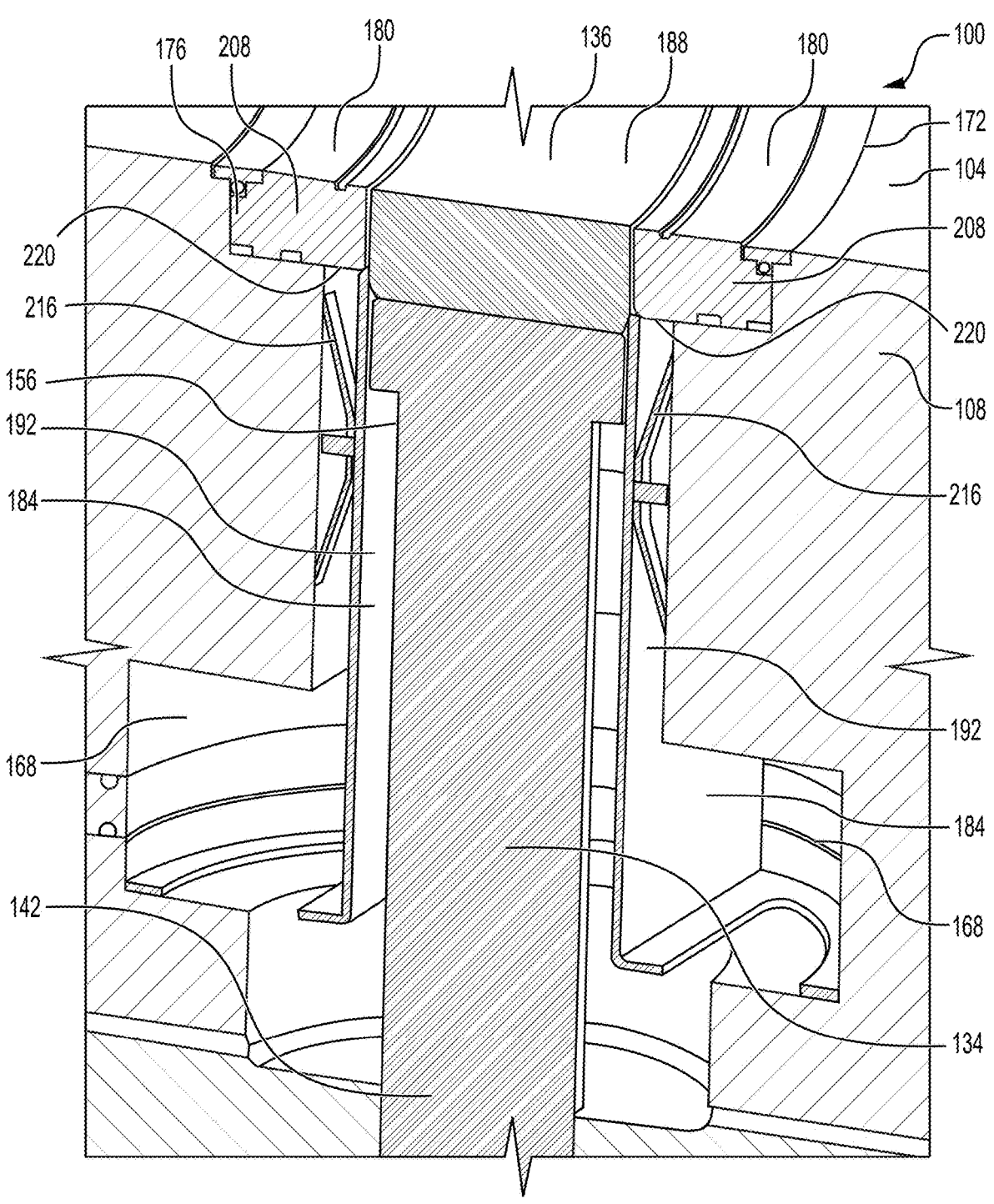
FIG. 3 is a detailed schematic, perspective view with a portion shown in cross section of the illustrative embodiment of the slab gate valve with a concentric valve skirt of FIG. 2.

Referring now to the figures and primarily to FIGS. 1-3, and initially to FIG. 1, an illustrative embodiment of a slab gate valve 100 is presented. The slab gate valve 100 has a through-bore 104, which is a circular bore through the length of a valve body 108, for allowing a fluid flow therethrough as desired. The through-bore 104 is oriented along the length of the valve body 108 in a first direction 112. The slab gate valve 100 is coupled to a pipe or other tubing, through which fluid may flow in the first direction 112, with a first flange 116 and a second flange 120. A studded connection may also be used to attach pipes or other tubing to the first flange 116 and the second flange 120. A pipe or other tubing is connected to the first flange 116 and the second flange 120 with bolts or studs using a plurality of bolt holes 124, so that fluid may flow through the through-bore 104 in the first direction 112. It should be noted that slab gate valve 100 may be bi-directional, but for convenience, is presented with flow in a single direction.

Referring now primarily to FIGS. 2 and 3, a gasket pocket 152 is disposed within the end of each flange 116 and 120 so that a gasket may be inserted into the gasket pocket 152 to provide a fluid seal between the first flange 116 or the second flange 120 and an upstream or downstream pipe or tubing connection, e.g., a mating flange.

An upper bonnet 128 and a lower bonnet 132 are located on an upper side and a lower side, respectively, of the valve body 108. All relative directions, e.g., "upper" and "lower," are for the orientation shown in the figures. The upper bonnet 128 and the lower bonnet 132 are used to attach and contain a portion of a gate assembly 134 within the valve body 108. The gate assembly 134 is formed of a gate 136, an upper stem 140, and a lower stem 142. The upper bonnet 128 and the lower bonnet 132 are coupled to the valve body 108 with studs or bolts using a plurality of bolt holes 144. The upper stem 140 and the lower stem 142 extend from the centers of the upper and lower ends of the upper bonnet 128 and the lower bonnet 132, respectively. The upper stem 140 and the lower stem 142 are used to actuate the gate assembly 134 between an open and closed position and any desired intermediate position.

A gate cavity 156 is a cavity within the valve body 108 that is oriented in a second direction 114 (vertical for the orientation shown) and that is perpendicular to and transects the through-bore 104. The gate cavity 156 is sized and configured to receive the gate assembly 134. An upstroke lubricant cavity 164 and a downstroke lubricant cavity 168 are partially formed by cutouts from the valve body 108 at the upper and lower ends of the gate cavity 156, respectively. The upstroke lubricant cavity 164 and the downstroke lubricant cavity 168 are also partially formed by cutouts within the upper bonnet 128 and the lower bonnet 132, respectively. When the upper bonnet 128 and the lower bonnet 132 are assembled onto the valve body 108, the cutouts within the upper bonnet 128 and the valve body 108 and the cutouts within the lower bonnet 132 and the valve body 108 align to form the upstroke lubricant cavity 164 and the downstroke lubricant cavity 168, respectively. The connection between the upper bonnet 128 and the valve body 108 is sealed from fluid flow by an upper bonnet gasket 130. Likewise, the connection between the lower bonnet 132 and the valve body 108 is sealed from fluid flow by a lower bonnet gasket 138. The lower bonnet gasket 138 and the upper bonnet gasket 130 are made from suitable gasket material, such as any compressible material, for example any of the NBR type rubbers, or metallic, for example 316 Stainless Steel.

The through-bore 104 has a diameter 148, which is of sufficient size to allow for the desired flow through slab gate valve 100. In one embodiment the diameter 148 is in the range of 1¹³⁄₁₆" thru 7¹⁄₁₆". Those skilled in the art will appreciate that other sizes may be used.

An upstream seat pocket 172 and a downstream seat pocket 176 are cavities within the valve body 108 within the through-bore 104 at the intersection of the through-bore 104 and the gate cavity 156. The upstream seat pocket 172 and the downstream seat pocket 176 are both configured to receive a seat assembly 180, which provides fluid and pressure seals between the seat assemblies 180 and the gate assembly 134. The upstream seat pocket 172 and the downstream seat pocket 176 are annular rings that are concentric with the through-bore 104.

Each seat assembly 180 includes a seat 208 and a debris ring 212. The seat 208 is annular and is sized and configured to fit within the upstream seat pocket 172 or the downstream seat pocket 176. When located within the upstream seat pocket 172 or the downstream seat pocket 176, the seat 208 is concentric with the through-bore 104. A surface of the gate 136 is in contact with a surface of the seat 208 so that a fluid seal is formed between the seat 208 and the gate 136 to prevent or substantially reduce fluid flow from the through-bore 104 between the seat 208 and the gate 136.

As the slab gate valve 100 is operated between an opened and a closed position, the gate assembly 134 moves back and forth along the second direction 114 within the gate cavity 156. This movement results in movement of the upper end of the gate 136 and the upper stem 140 through at least a portion of the upstroke lubrication cavity 164 and movement of the lower end of the gate 136 and the lower stem 142 through at least a portion of the downstroke lubrication cavity 168. In the course of this movement, the gate 136, the upper stem 140, and the lower stem 142 are lubricated by lubricants within the upstroke lubrication cavity 164 and the downstroke lubrication cavity 168.

A concentric skirt assembly 184, which is discussed in more detail below, acts as a barrier to prevent excessive exchange of lubricants and fluids between the through-bore 104 and the downstroke lubrication cavity 168 and the upstroke lubrication cavity 164 during the opening and closing process.

When the gate 136 is in an open position (e.g. see FIG. 2), through-bore fluid is allowed to pass through an opening 188 of the gate 136, however through-bore fluids are not able to freely flow past the seal between the seat 208 and the gate 136. However, as the gate 136 is moved from an open position to a closed position, the opening 188 moves along a length of the gate cavity 156 in direction 114. This may result in at least the partial loss of contact between the gate 136 and the seat 208, which results in the loss of fluid seal between the gate 136 and the seat 208. Without the concentric skirt assembly 184 in place, through-bore fluid trapped within the opening 188 in the gate 136 is then able to flow into the upstroke lubricant cavity 164 or the downstroke lubricant cavity 168. Likewise, lubricant located within the upstroke lubricant cavity 164 or the downstroke lubricant cavity 168 is able to flow into the opening 188 in the gate 136. This results in the fluid in the through-bore 104 intermingling with the lubricants from the upstroke lubricant cavity 164 or the downstroke lubricant cavity 168, the intermingling of the lubricants from the upstroke lubricant cavity 164 or the downstroke lubricant cavity 168 with the fluid flowing through the through-bore 104, and the loss of lubricant from the upstroke lubricant cavity 164 or the downstroke lubricant cavity 168.

The concentric skirt assembly 184 prevents or reduces the exchange of fluids between the through-bore 104 and other portions of the slab valve gate 100 by providing a seal between the gate 136 and a concentric skirt 192 of the concentric skirt assembly 184 which prevents or substantially reduces fluid flow from the through-bore 104 past the concentric skirt 192.

Figure 4:
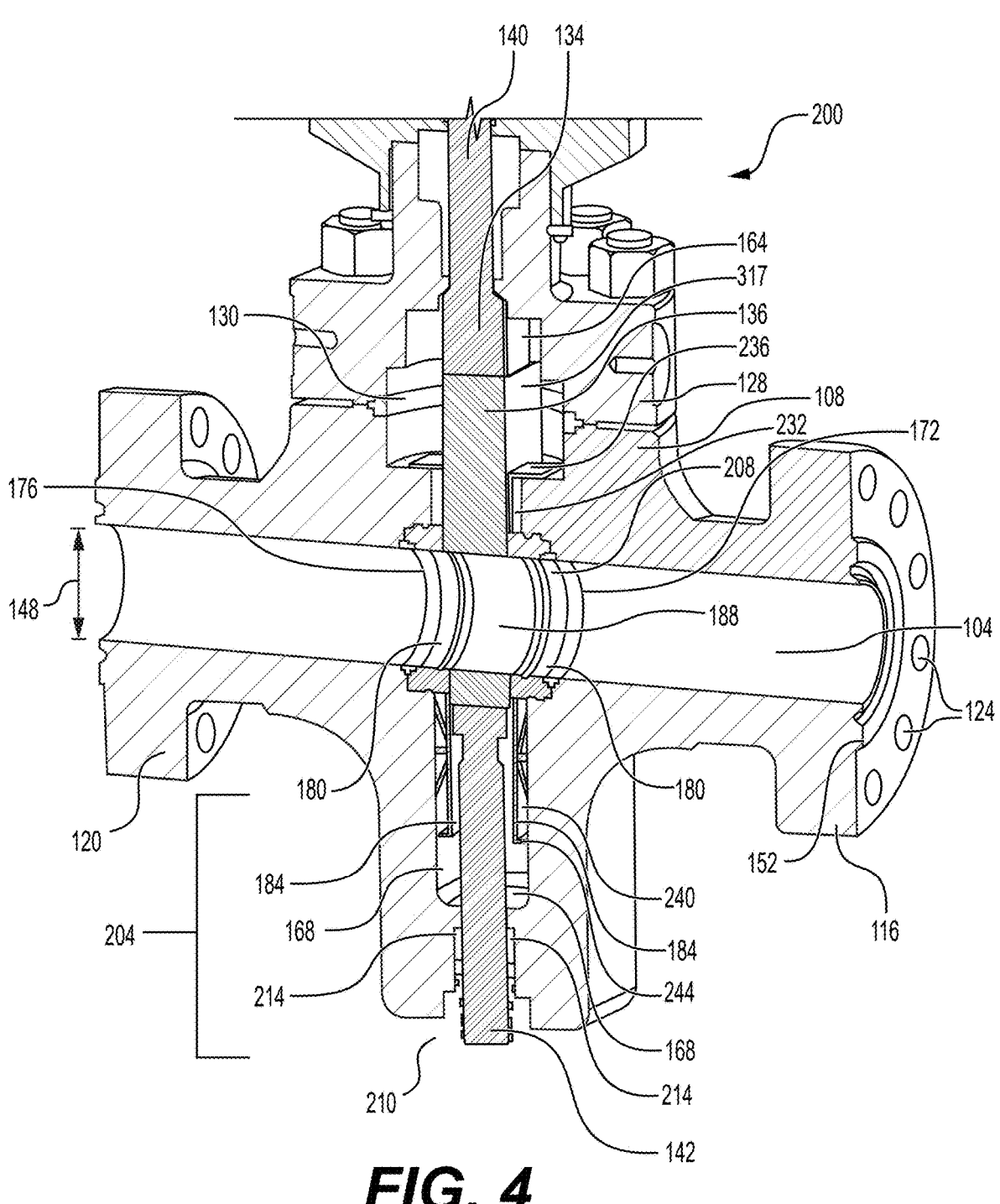
FIG. 4 is a schematic perspective view with a portion shown in cross section of an illustrative embodiment of a slab gate valve with a concentric valve skirt.

Referring now primarily to FIG. 4, an illustrative embodiment of a slab gate valve 200 with a concentric skirt 192 is presented. The slab gate valve 200 is analogous to the slab gate valve 100 described above in most aspects. The difference between the slab gate valve 200 and the slab gate valve 100 is that the slab gate valve 200 lacks the lower bonnet 132 of slab gate valve 100. Instead of having the lower bonnet 132, the lower portion 204 of the slab gate valve 200 is formed from the valve body 108 of the slab gate valve 200 as a unitary member. In the slab valve gate 100, the valve body 108 is open on the lower end, and the lower end of the gate cavity 156 is sealed and capped off by the lower bonnet 132, which is attached to the valve body 108. In the slab gate valve 200, a lower bonnet is not used. Instead, the valve body 108 of the slab gate valve 200 is formed and configured so that the valve body 108 forms the lower portion 204 of the slab gate valve 200.

The slab gate valve 200, like slab gate valve 100, has the lower stem 142 configured to mate or connect with the gate 136 operable to move the gate 136 between an open position and a closed position. The lower stem 142 of the slab gate valve 200 extends through a lower stem aperture 210 in the valve body to allow for connection of the lower stem 142 to an operator for actuating the slab gate valve 200. The lower stem 142 is sealed to the valve body 108 at the lower stem aperture 210 by seals 214 to prevent entry of fluids or debris into the downstroke lubricant cavity 168, which contains lubricants for lubricating the moveable components in the lower end 204 of the slab gate valve 200. The downstroke lubricant cavity 168 of the slab gate valve 200 is similar to that of slab gate valve 100, except the entire downstroke lubricant cavity 168 of the slab gate valve 200 is formed within the valve body 108, since the slab gate valve 200 does not have a lower bonnet.

Like the slab gate valve 100, the slab gate valve 200 also has a concentric skirt assembly 184 to prevent or reduce fluid exchange between the downstroke lubricant cavity 168 and the through-bore 104. The concentric skirt assembly 184 of the slab gate valve 100 operates in a manner that is similar to the concentric skirt assembly 184 of the slab gate valve 200.

Figure 5:
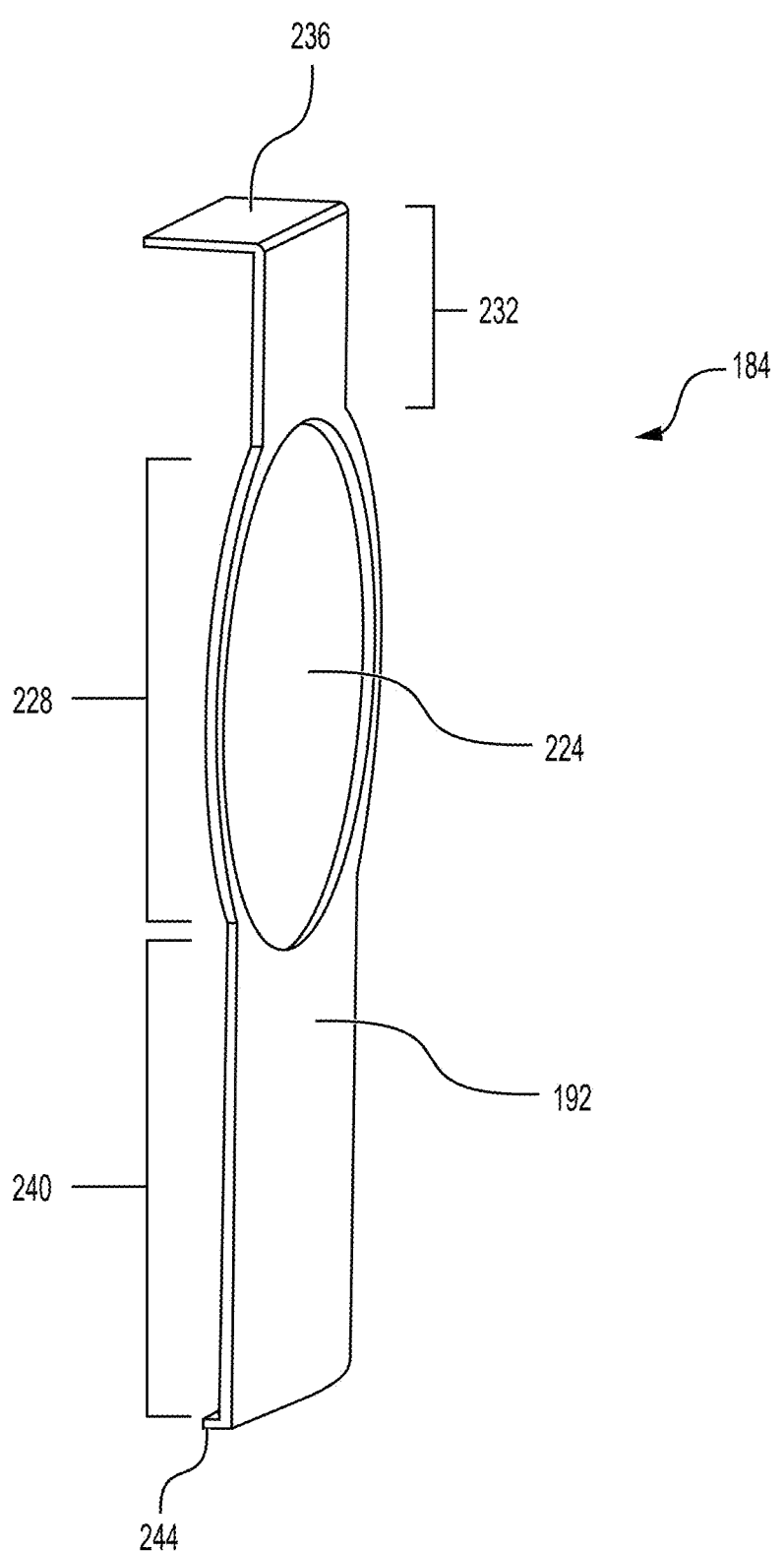
FIG. 5 is a schematic, perspective view of an illustrative embodiment of a concentric valve skirt.
Figure 6:
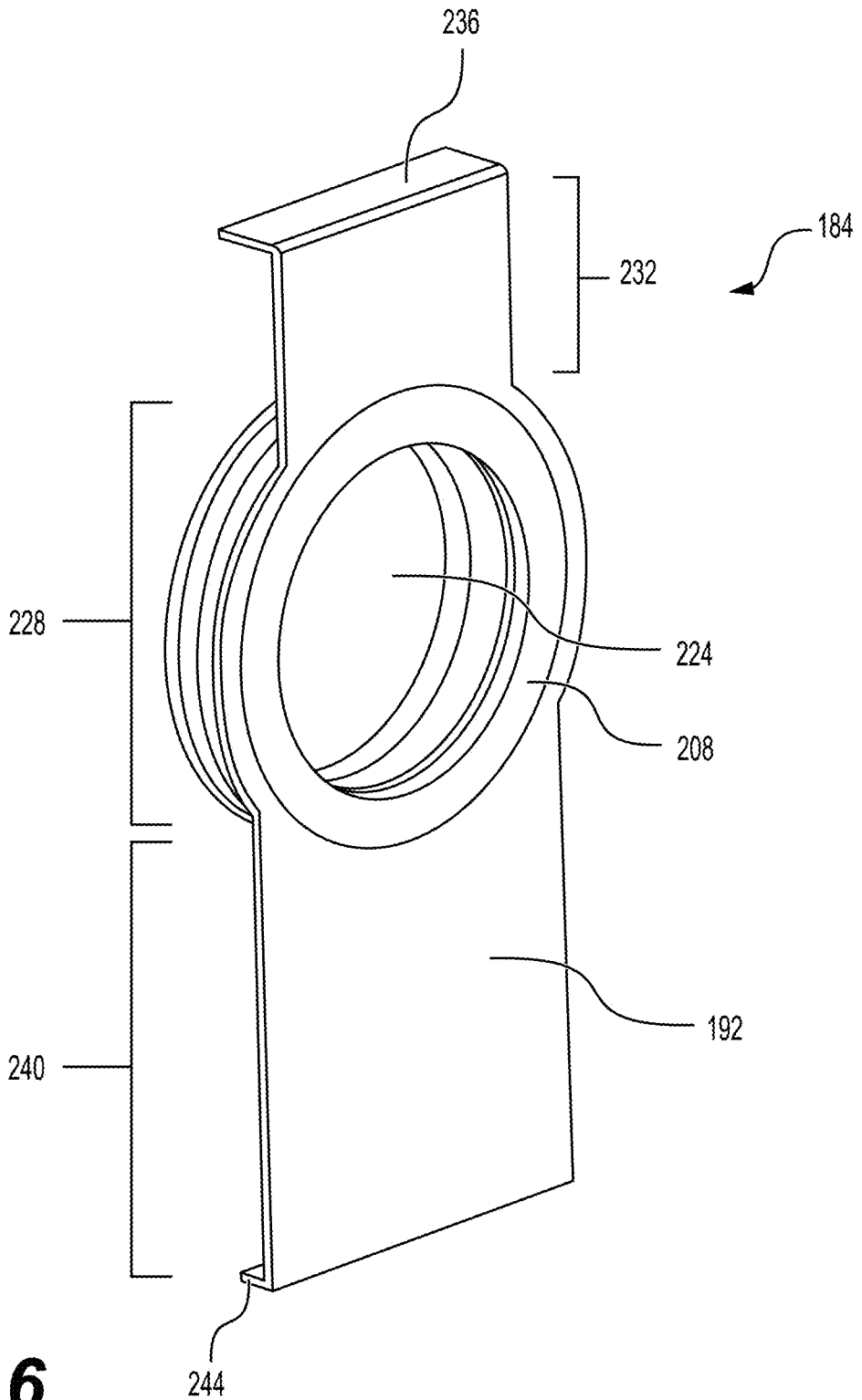
FIG. 6 is a schematic, perspective view of a seat and an illustrative embodiment of a concentric valve skirt.
Figure 7:
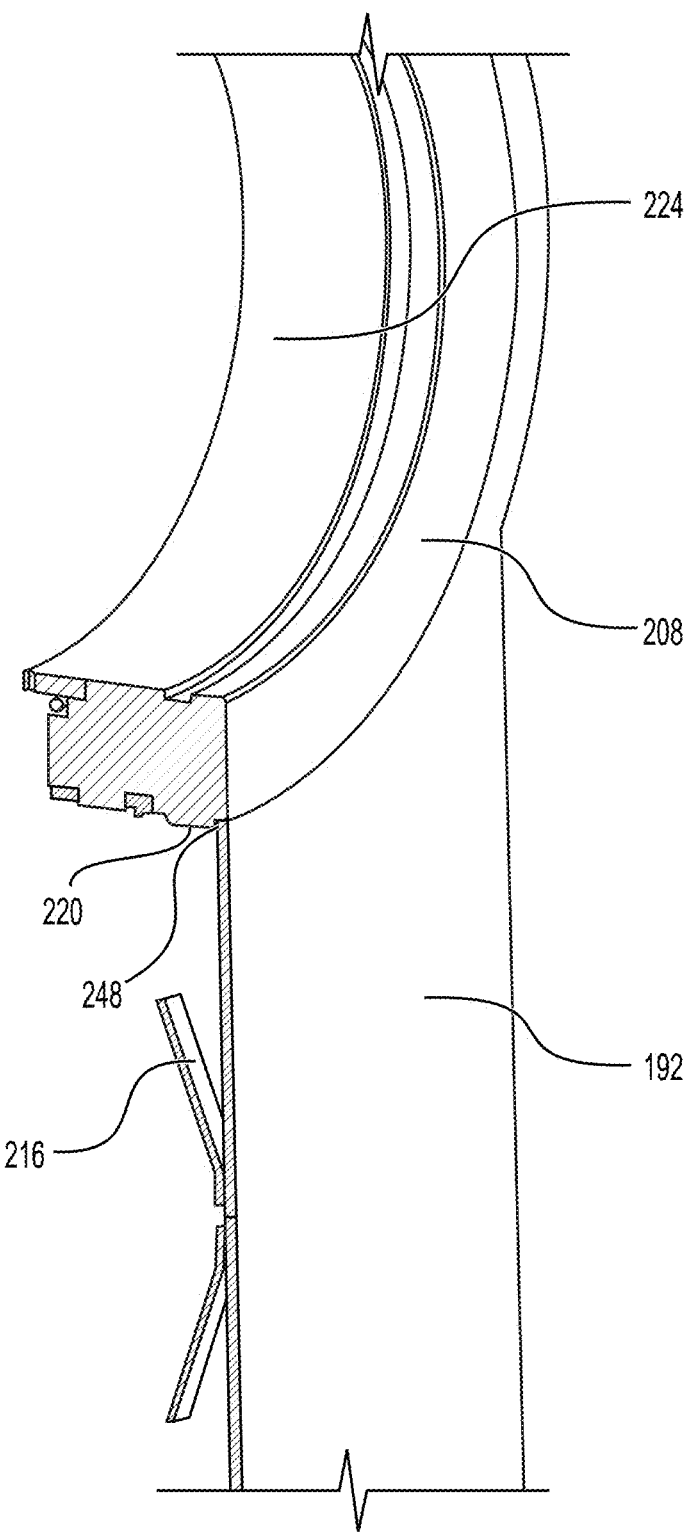
FIG. 7 is schematic, detailed perspective view of with a portion shown in cross section of the seat and the illustrative embodiment of a concentric valve skirt of FIG. 6.

Referring now primarily to FIGS. 5, 6, and 7, the concentric skirt assembly 184 will be more fully described. FIG. 5 depicts a schematic perspective view of a portion of the concentric skirt assembly 184. FIG. 6 depicts a schematic perspective view of a portion of the concentric skirt assembly 184 and the seat 208, and FIG. 7 depicts a schematic close up perspective cross-sectional view of the concentric skirt assembly 184 and the seat 208. The concentric skirt assembly 184 includes a concentric skirt 192 and a skirt energizer 216. As shown in FIGS. 6 and 7, the concentric skirt 192 is formed with an opening 224 that is sized and configured to receive an outer edge 220 of the seat 208, so that the seat 208 is inserted into the opening 224. Since the seat 208 is annular, the opening 224 of the concentric skirt 192 is circular or annular in shape to mate with the concentric skirt 192. For this reason, the concentric skirt 192 may also be referred to as an annular skirt or ring. The seat 208 fits over the opening 224 to form a substantial fluid seal.

As shown in FIGS. 5, 6, and 7, the concentric skirt 192 has a middle ring portion 228 in which the opening 224 is located and that is generally shaped like a ring, and, as described above, is able to accept the seat 208. Extending from one direction from the middle ring portion 228 is an upper skirt portion 232. The upper skirt portion 232 is solid and generally planar in shape. The upper skirt portion 232 also includes an upper tab 236, which is located at the upper end of the concentric skirt 192. Extending from the middle ring portion 228, in the opposite direction from the upper skirt portion 232, is a lower skirt portion 240. The lower skirt portion 240 is solid and generally planar in shape. The lower skirt portion 240 includes a lower tab 244, which is located at the lower end of the concentric skirt 192. In some embodiments, the middle portion 228 may not be ring shaped, for example, the middle portion may have straight outer edges leading to the upper skirt portion 232 or the lower skirt portion 240. In other embodiments, the entire concentric skirt 192 may be rectangular with the opening 224 formed within the rectangular body of the concentric skirt 192. In other embodiments, the opening 224 may be other shapes or sizes to receive a seat of a different size or shape.

The concentric skirt 192 fits into a groove 248 located on the outer edge 220 of the seat 208. The groove 248 is sized and configured to accept the inner edge 223 of the opening 224 of the concentric skirt 192. In other embodiments the groove 248 may be absent.

When the concentric skirt 192 is mounted onto the seat 208, the annular middle ring portion 228 of the concentric skirt 192 is concentric with the ring or annular shaped seat 208, as shown in FIG. 6. In addition, when the concentric skirt 192 is mounted onto the seat 208 and the seat 208 is in the upstream seat pocket 172 or the downstream seat pocket 176, the concentric skirt 192 is supported by the seat 208 and is suspended within the gate cavity 156. The concentric skirt 192 is oriented within the gate cavity 156 so that the concentric skirt 192 is in contact with a surface of the gate

136. The middle ring portion 228 of the concentric skirt 192 is at least partially located within the through-bore 104 of the valve body 108, and the opening 224 of the concentric skirt 192 is concentric with the through-bore 104 of the valve body 108.

As shown in FIG. 4, the upper skirt portion 232 of the concentric skirt 192 extends into the gate cavity 156 and into the upstroke lubricant cavity 164. The upper tab 236 of the concentric skirt 192 extends away perpendicularly from the main body of the concentric skirt 192 and contacts an inner wall of the valve body 108 within the upstroke lubricant cavity 164. In this manner, the concentric skirt 192 creates a barrier between the upstroke lubricant cavity 164 and the through-bore 104, which prevents or substantially reduces fluid flow and exchange between the upstroke lubricant cavity 164 and the through-bore 104.

In a similar manner, the lower skirt portion 240, when attached to the seat 208 and the seat 208 is located within in the upstream seat pocket 172 or the downstream seat pocket 176, extends into the downstroke lubricant cavity 168 and contacts the gate 136 below the through-bore 104. The lower tab 244 extends perpendicularly away from the main body of the concentric skirt 192 to contact an interior wall of the valve body 108 within the downstroke lubricant cavity 168. In this manner, the concentric skirt 192 forms a barrier between the downstroke lubricant cavity 168 and the through-bore 104, which prevents or substantially reduces fluid flow or exchange between the downstroke lubricant cavity 168 and the through-bore 104.

In some embodiments, the upper tab 236 and the lower tab 244 may be omitted.

The concentric skirt assembly 184 includes a skirt energizer 216. The skirt energizer 216 is attached to one side of the lower skirt portion 240. When the concentric skirt assembly 184 is within the gate cavity 156, the lower skirt portion 240 and the skirt energizer 216 of the concentric skirt assembly 184 are located within the downstroke lubricant cavity 168. The skirt energizer 216 is located between the concentric skirt 192 and an inner wall of the valve body 108 within the downstroke lubricant cavity 168 and contacts the inner wall of the valve body 108 within the downstroke lubricant cavity 168. The skirt energizer 216 provides a biasing force to bias the concentric skirt 192 toward the gate 136. This biasing force may improve the quality of the liquid seal between the concentric skirt 192 and the gate 136 by enhancing the contact between the concentric skirt 192 and the gate 136. The biasing force also improves the quality of this seal by dynamically pushing the concentric skirt 192 toward the gate 136 in response to any gate movement in a direction that is away from the concentric skirt 192.

As can be seen in FIG. 4, the concentric skirt 192 is at least partially disposed within the downstroke lubricant cavity 168 of the gate valve 200. When the gate valve 200 is moved from the open position to the closed position the gate 136 translates in the second direction 114 so that the opening 188 of the gate 136 moves from being inline with the through-bore 104 to being located below the through-bore 104 and being more disposed within the downstroke lubricant cavity 168. In this position, the concentric skirt 192 is at least partially disposed adjacent to the gate and forms a fluid seal to prevent or reduce transfer of fluid from the opening 188 past the concentric skirt 192. The concentric skirt 192 acts as a shield to prevent fluid transfer between the through-bore fluid trapped within the opening 188 and the downstroke lubricant cavity 168. Thus, preventing or reducing the exchange of through-bore fluids located within the opening 188 with the lubricants located in the downstroke lubricant cavity 168. Thereby, the concentric skirt 192 may reduce lubricant loss and fluid contamination.

In the illustrative embodiment of the concentric skirt assembly 184 of FIGS. 5, 6, and 7, the skirt energizer 216 is a single cantilever spring.

It will be appreciated that other the types and configurations of energizers 216 of the concentric skirt assembly 184 utilizing the concentric skirt 192 may also be used in the concentric skirt assembly 184. It should also be appreciated the multiple energizers 216 may be used in the concentric skirt assembly 184.

Figure 8:
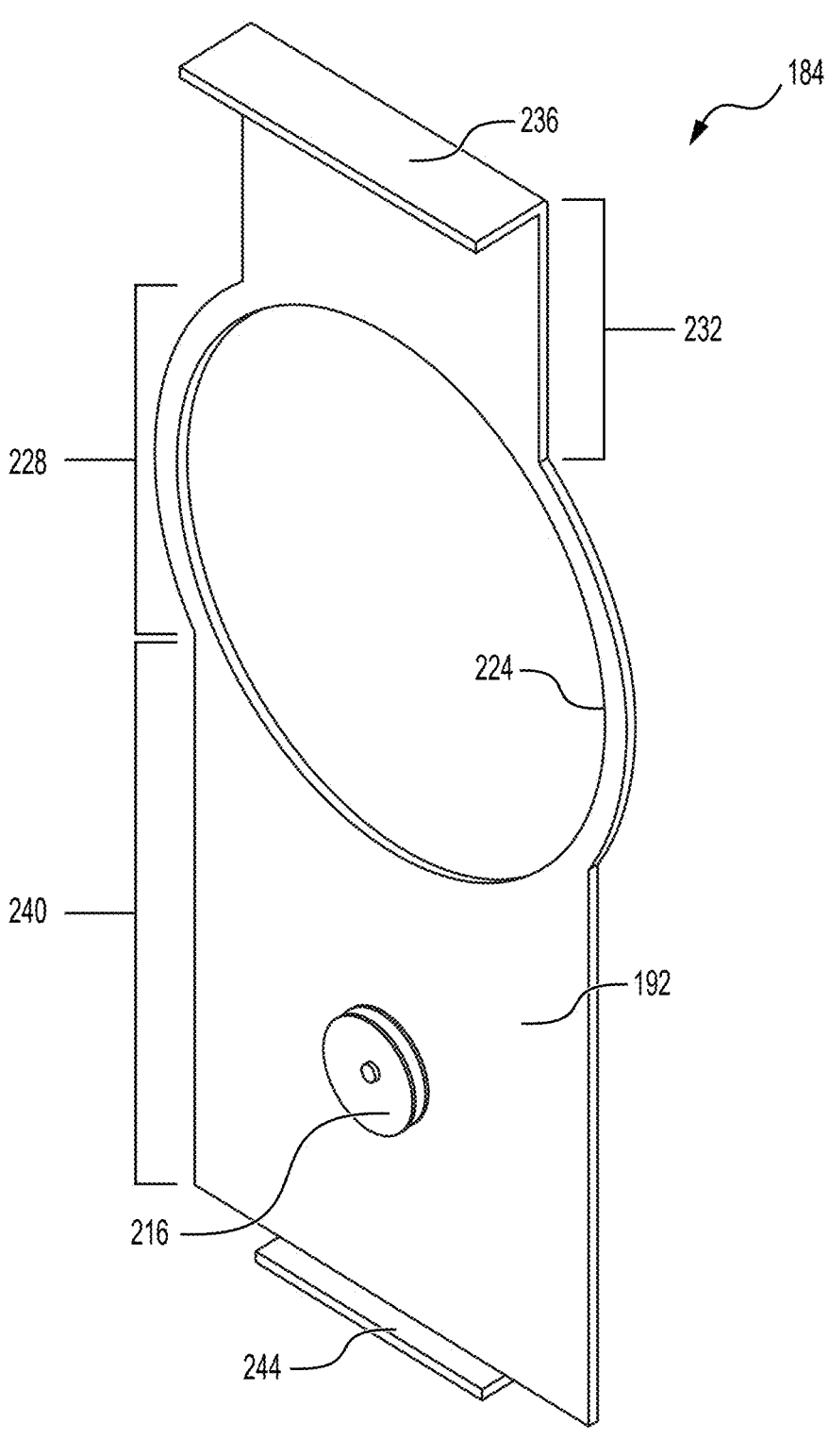
FIG. 8 is a schematic, perspective view of an illustrative embodiment of a concentric valve skirt.
Figure 9:
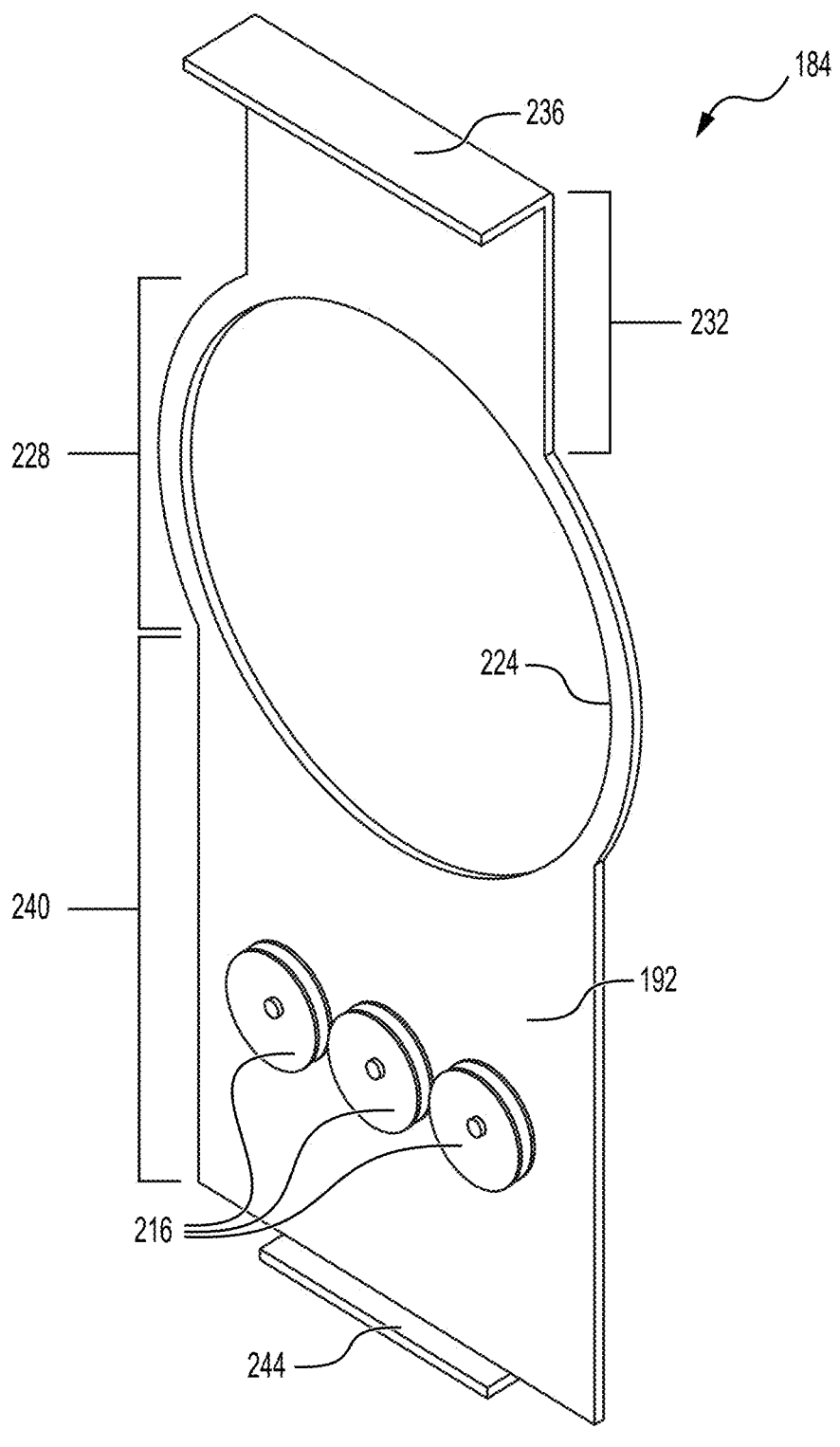
FIG. 9 is a schematic, perspective view of an illustrative embodiment of a concentric valve skirt.
Figure 10:
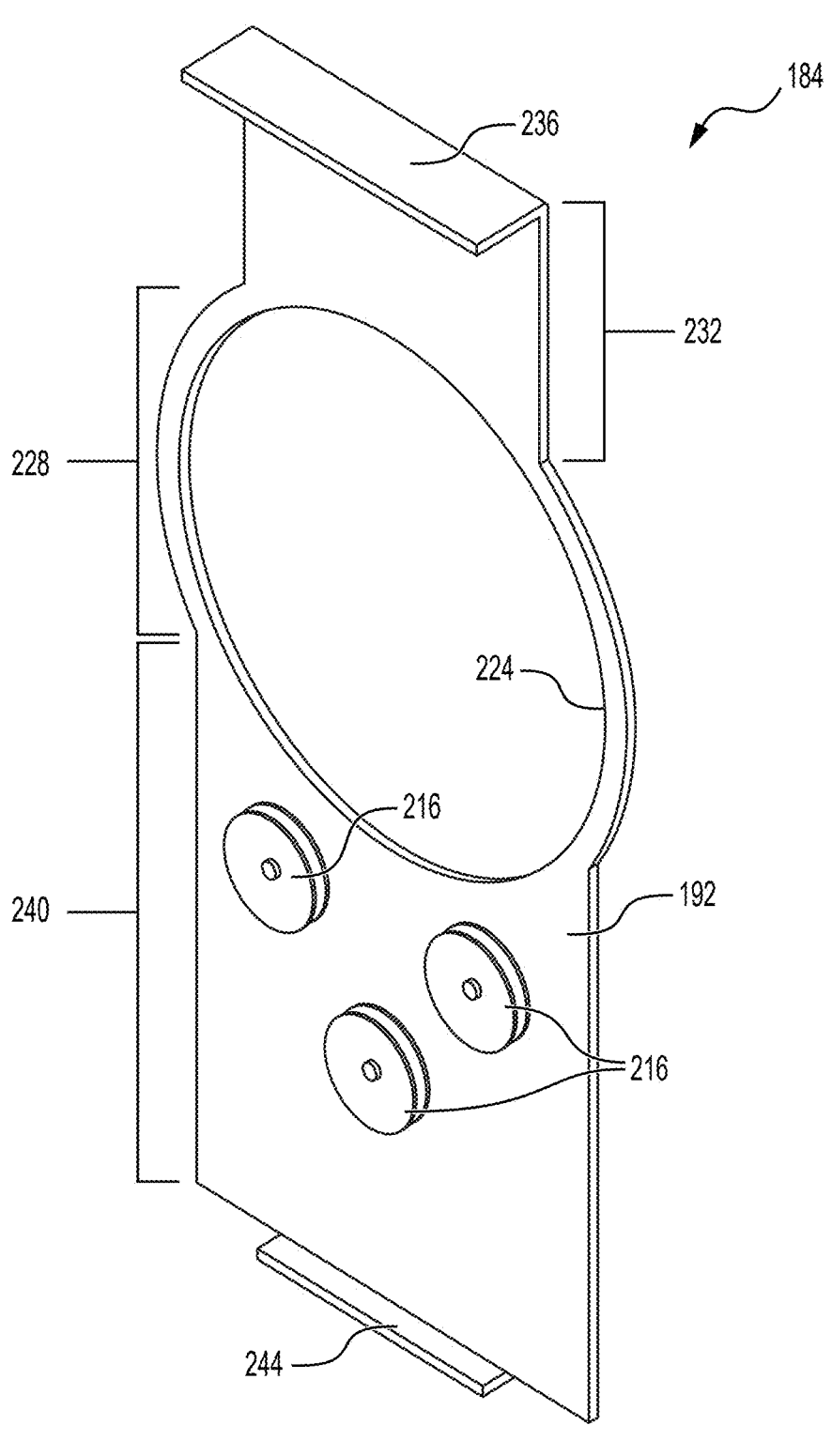
FIG. 10 is a schematic, perspective view of an illustrative embodiment of a concentric valve skirt.
Figure 11:
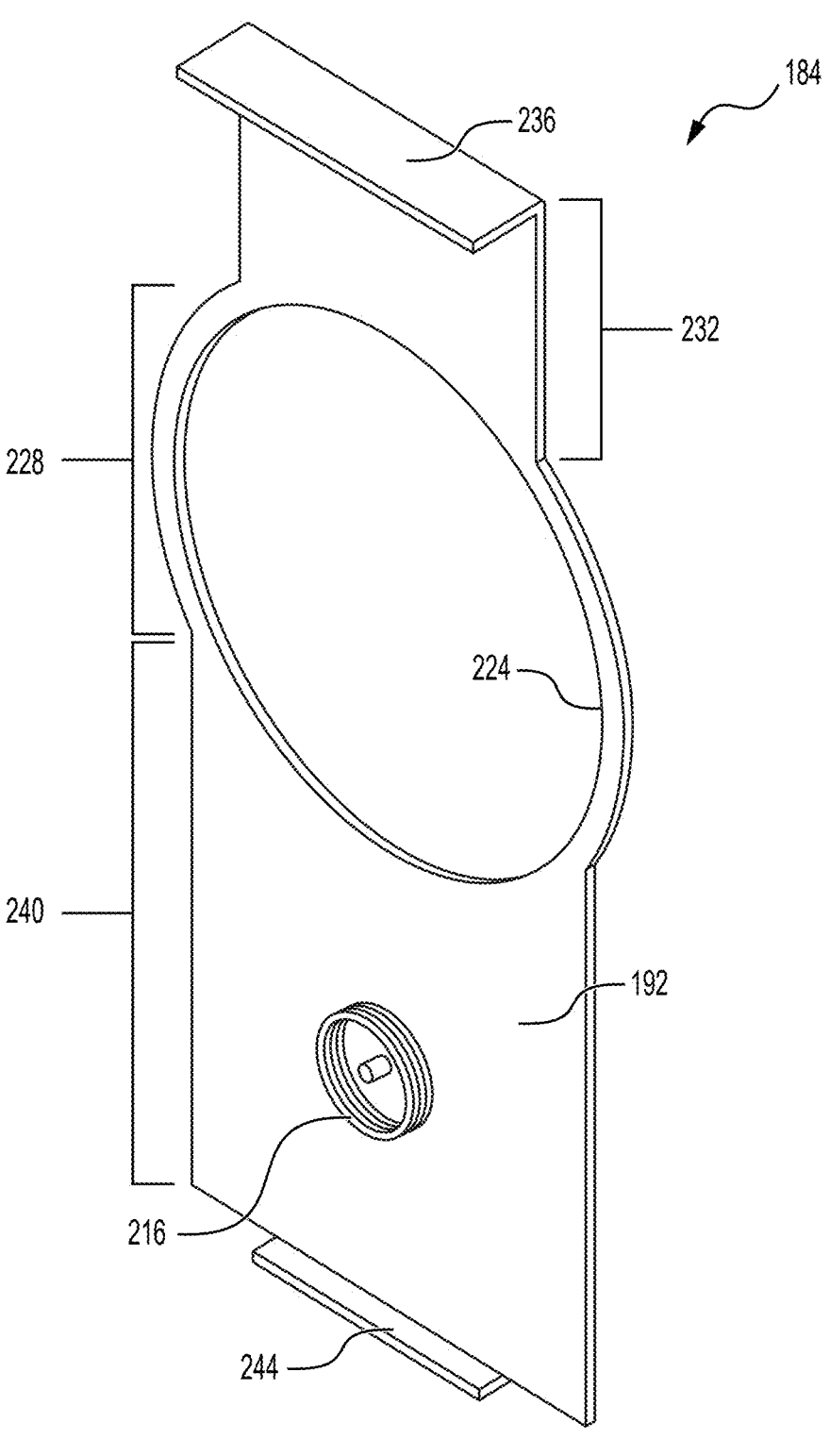
FIG. 11 is a schematic, perspective view of an illustrative embodiment of a concentric valve skirt.
Figure 12:
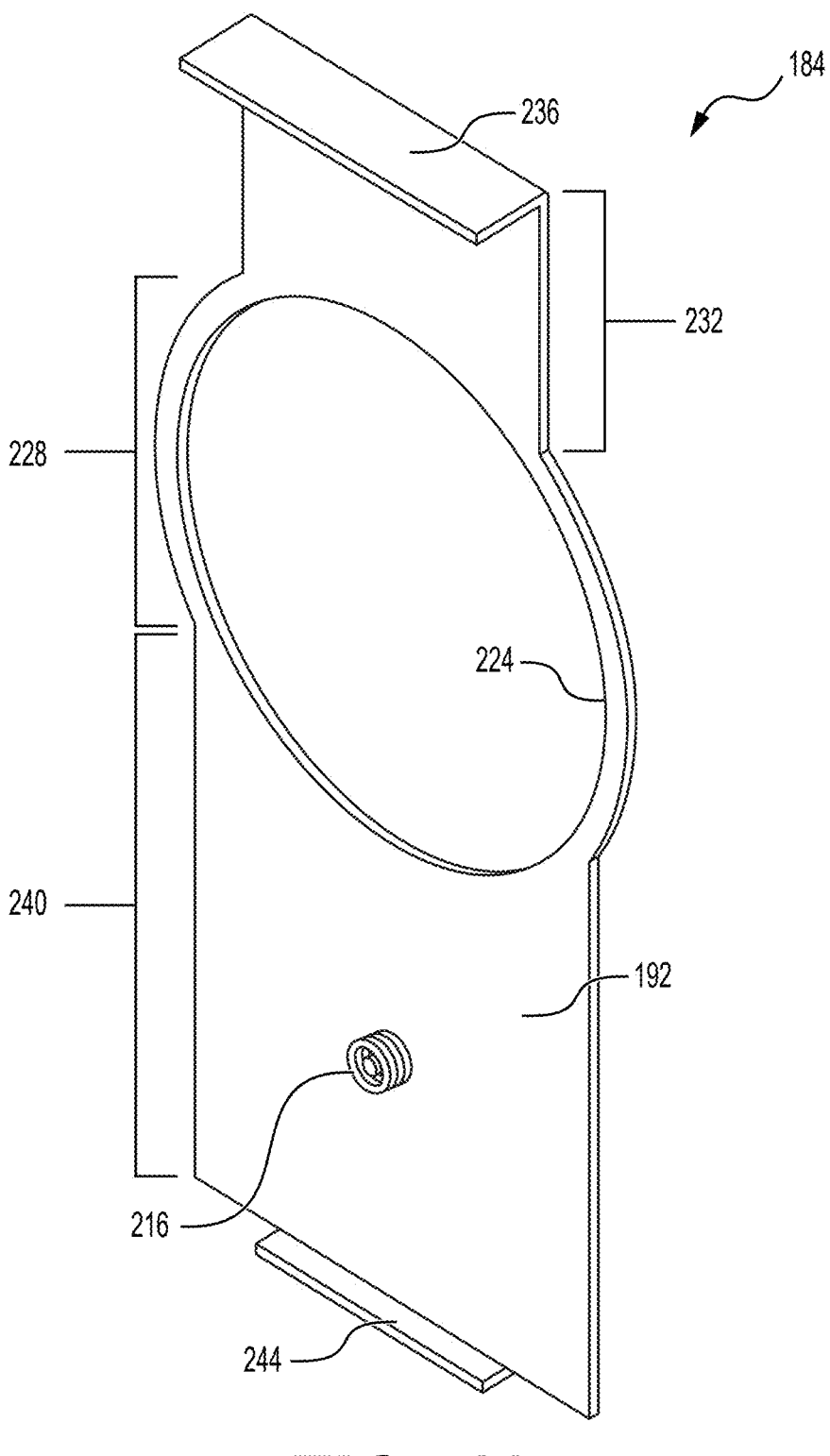
FIG. 12 is a schematic, perspective view of an illustrative embodiment of a concentric valve skirt.

FIGS. 8-12 depict other, non-limiting, energizer 216 types and configurations that may be used. FIG. 8 depicts the use a two stacked belleville washers for the energizer 216. It will be appreciated that other numbers of bellville washers may be used in the stack, e.g. 1, 3, 4, 5, or 6, to change the overall depth and biasing force of the energizer 216. FIG. 9 depicts the use of three stacks of bellville washer as the energizers 216 in which the energizers 216 are arranged linearly. FIG. 10 depicts the use of three stacks of belleville washers as the energizers 216 in which the energizers 216 are arranged in a triangular fashion on the surface of the concentric skirt 192. In FIG. 11, the energizer 216 is a single coil spring. In FIG. 12 the energizer 216 is a single wave spring.

It should also be appreciated that the illustrative embodiments of energizer types and configurations shown in the figures may be varied or combined. Other combinations and variations of types, number, and placement of energizers 216 may be used.

The energizers 216 of the concentric skirt assembly 184 may provide a net combined force in the range of 50-1000 pounds force. The energizers 216 or concentric skirt 192 of the skirt assembly 184 may made from 304 stainless steel, 316 stainless steel, Elgiloy, Monel, Spring Steel (1074/1075, 1095, 5160, or Inconel, for example.

Figure 14:
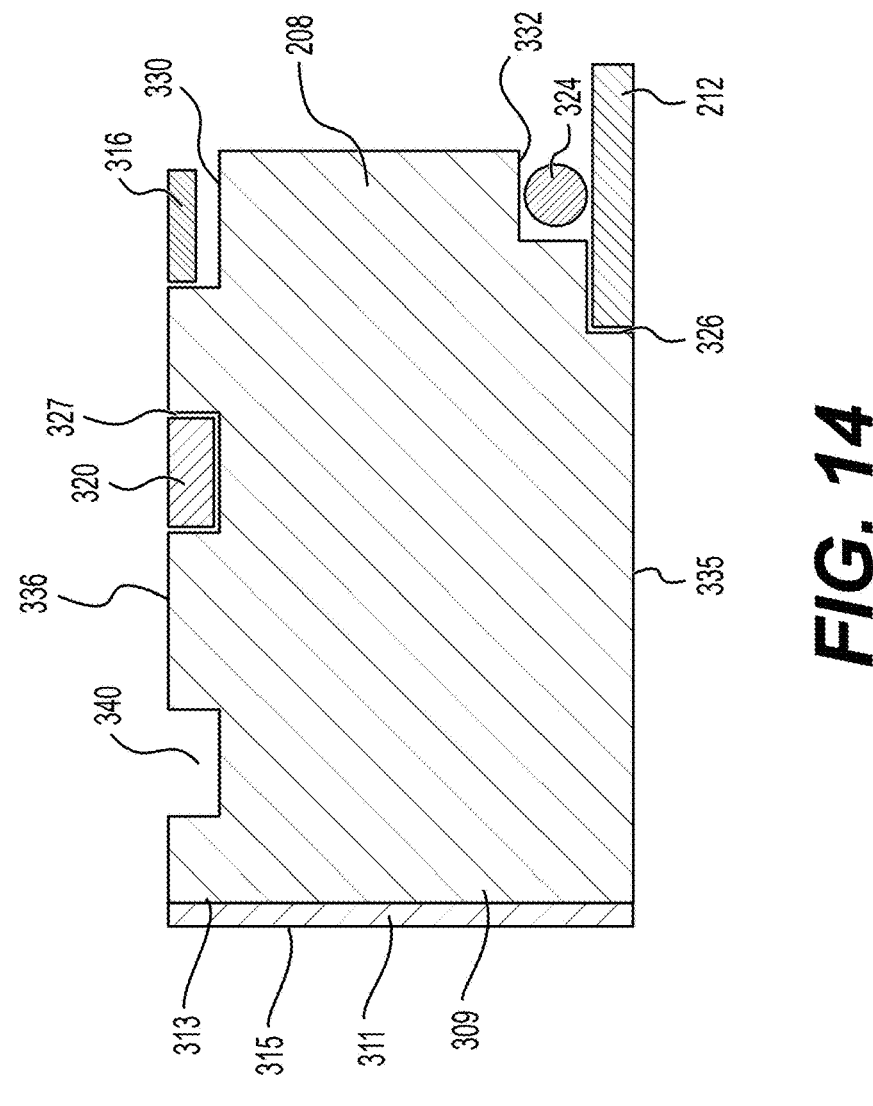
FIG. 14 is a schematic, cross-sectional view of a seat assembly of a slab gate valve with a dynamic skirt.
Figure 13:
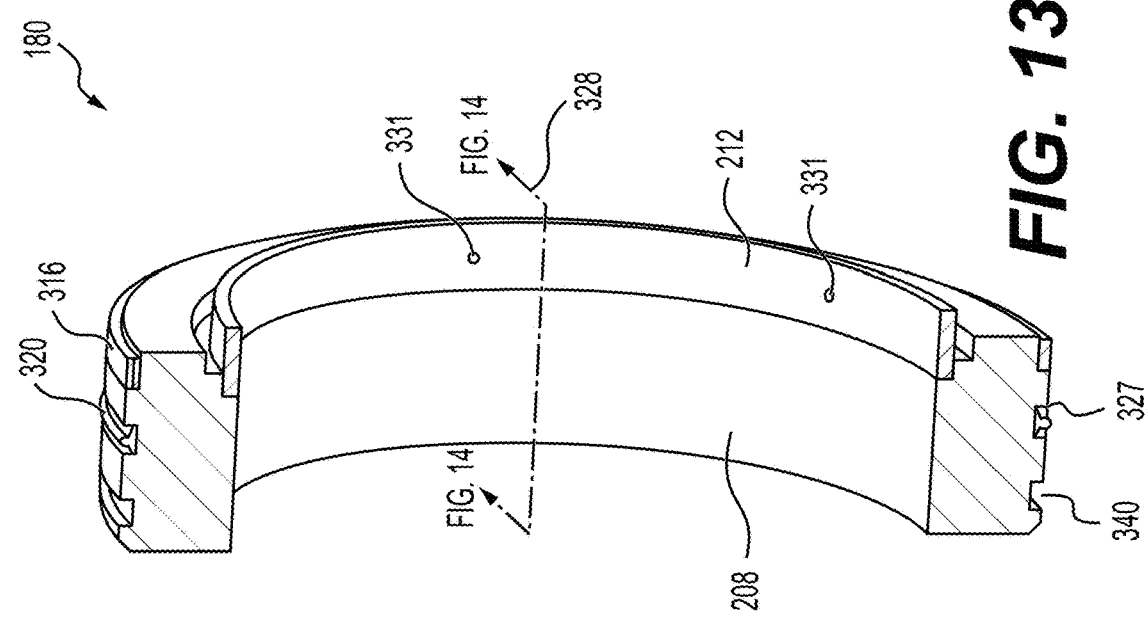
FIG. 13 is a schematic, perspective view with a portion shown in cross section of a portion of a seat assembly of a slab gate valve with a dynamic skirt.

Referring now to FIGS. 13 and 14, further aspects of the gate valve 100 and gate valve 200 will be discussed with a focus on the sealing aspects of the gate 136 and the seat 208. In regard to the sealing aspects of the gate 136 and the seat 208 the gate valve 200 is analogous to the gate valve 100.

The seat 208 may be a dynamic seat which is urged toward the gate 136 by the biasing force of a seat energizer 324 (FIG. 14), which may improve the quality of the seal between the gate 136 and the seat 208.

In some embodiments the gate 136 is formed from relatively hard and corrosive resistant material, such as stainless steel, or, in particular 410 stainless steel. The gate 136 has a gate sealing surface 317 on each side of the gate 136. Each gate sealing surface, when installed within the gate valve 100, faces a dynamic seat assembly 180 such that, when the gate valve 100 is in the closed position, the gate sealing surface 317 mates with a gate contact surface 315 (FIG. 14) of the dynamic seat assembly 180. The contact between the gate sealing surface 317 of the gate 136 and the gate contact surface 315 of the dynamic seat assembly 180 provides a fluid seal to prevent fluids within the through-bore 104 passing past such seal. In some embodiments, this is achieved by a metal to metal only seal between the gate 136 and the dynamic seat assembly 180. In other words, only contact between the metallic component of the gate sealing surface 317 of the gate 136 and the metallic component of the gate contact surface 315 of the dynamic seat assembly 180 are necessary to achieve the desired seal to prevent through bore fluids from passing the metal to metal only seal.

In some embodiments, the metal to metal only seal is formed between the 410 stainless steel of the gate 136 and the 410 stainless steel of the seat 208 of the dynamic seat assembly 180. In some embodiments, either or both the gate contact surface 315 or the gate sealing surface 317 is coated with a coating, such as a tungsten carbide coating to increase the hardness of the gate contact surface 315 or the gate sealing surface 317 to reduce wear on these components. In some embodiments, the metal to metal only seal is formed wherein both the gate contact surface 315 and the gate sealing surface 317 are coated with tungsten carbide. In some embodiments, the metal to metal only seal is achieved where only one or the other of the gate contact surface 315 or the gate sealing surface 317 is coated with tungsten carbide and the other component is uncoated 410 stainless steel. In yet other embodiments, the metal to metal only seal is achieved wherein the coating is omitted from both the gate contact surface 315 and the gate sealing surface 317. For example, when both the gate contact surface 315 and the gate sealing surface 317 are formed from 410 stainless steel without the coating.

In some embodiments, the coating may be formed from materials other than tungsten carbide. Other coating materials that may be used include Colmonov, ceramic, salt bath nitriding or quench-polish-quench (SBN/QPD), PCB diamond, K-Tech, ARMOLY or armacor based coatings. In some embodiments, the coating has a hardness of at least 70 HRB on the Rockwell hardness scale. In some embodiments, the coating has a hardness of at least 70 HRC or 70 HRB on the Rockwell hardness scale. Materials other than stainless steel or 410 stainless steel may be used to form the gate 136, seat 208, gate contact surface 315, or the gate sealing surface 317. For example, other materials that may be used include fully coated 4130 carbon steel, uncoated 4130 carbon steel, Inconel, nickel-chromium based alloys, Hastelloy, nickel alloys, monel, nickel-copper alloys, titanium, nitronic, or nitrogen strengthened stainless steel alloys.

In addition, in some embodiments, the metal to metal only seal, as described above, is achieved without the need to use a sealing fluid or sealing compound between or around the gate contact surface 315 and the gate sealing surface 317. In addition, the metal to metal only seal between the gate contact surface 315 and the gate sealing surface 317, as described above, is achieved without the need to use a gasket, elastomer, polymer, or other sealing component. The metal to metal only seal is achieved only through the contact between the smooth planar gate contact surface 315 and the smooth planar gate sealing surface 317. As used herein, a metal to metal seal includes a seal formed between two metallic components with or without coatings as described herein.

Referring now primarily to FIGS. 13 and 14, an illustrative embodiment of the dynamic seat assembly 180 of a slab gate valve 100 is presented. FIG. 13 depicts a perspective view with a portion in cross section of the dynamic seat assembly 180. FIG. 14 depicts a cross-sectional view of the dynamic seat assembly 180 taken at the cross-section location 328 (FIG. 13). When installed within the slab gate valve 100, 200, the dynamic seat assemblies 180 are disposed within an upstream seat pocket 172 and a downstream seat pocket 176 (FIGS. 2 and 4).

The embodiment of the dynamic seat assembly 180 depicted in FIGS. 13 and 14 includes the seat 208, the first debris ring 212, a second debris ring 316, a seat seal 320, and the seat energizer 324 (FIG. 14). The seat 208 fits with a seat pocket (see 172 and 176 in FIGS. 2 and 4). The first debris ring 212 may be disposed at least partially in the first debris ring slot or shoulder 326. The second debris ring 316 may be disposed at least partially within a second debris ring shoulder or slot 330. The seat energizer 324 may be disposed at least partially in a seat energizer slot of the shoulder 332, which also may be referred to as a seat energizer cavity, and may be adjacent to a portion of the first debris ring 212. The seat 208 has a cylindrical body with an inner through-bore. The seat 208 has an inner wall 335 and outer wall 336, or perimeter.

In some embodiments, the seat 208 is a monolithic body 309 formed from a metallic material and does not include any flow paths or channels within the body 309. In some embodiments the seat 208 or monolithic body 309 is formed from stainless steel, such as 410 stainless steel. In some embodiments, the seat 208 or the monolithic body 309 is further coated with a coating 311 to increase the hardness of contact areas of the seat 208 or the monolithic body 309. In particular, the coating 311 may be applied to a first side 313 of the seat 208 or monolithic body 309 so that the gate contact surface 315 of the dynamic seat assembly 180 has an increased hardness to reduce wear on the dynamic seat assembly 180. In some embodiments, the coating 311 may be omitted and the gate contact surface 315 is the seat 208 or monolithic body 309.

Other coating materials, other than tungsten carbide, may be used. Other coating materials that may be used include Colmonov, ceramic, salt bath nitriding or quench-polish-quench (SBN/QPD), PCB diamond, K-Tech, ARMOLY or armacor based coatings or coating materials. In some embodiments, the coating 311 has a hardness of at least 70 HRB on the Rockwell hardness scale. In some embodiments, the coating 311 has a hardness of at least 70 HRC on the Rockwell hardness scale. Other materials, other than stainless steel or 410 stainless steel may be used to form the seat 208 or the gate sealing surface 217. For example, other materials that may be used include fully coated 4130 carbon steel, uncoated 4130 carbon steel, Inconel, nickel-chromium based alloys, Hastelloy, nickel alloys, monel, nickel-copper alloys, titanium, nitronic, or nitrogen strengthened stainless steel alloys.

The first debris ring 212 and the second debris ring 316 each provide a debris seal between the valve body 108 and the seat 208. The first debris ring 212 is perforated by the perforations 331 (FIG. 13) to allow pressure and fluid to pass through the first debris ring 212, while preventing large particles from passing through the seal. The perforations may be in the range of 0.063 inches or smaller and may be formed by machining via drill, waterjet, laser cutter, or other technique. The second debris ring 316 (FIG. 13) may have no perforations and may be sized to maintain a space between the seat 208 outside diameter and the valve body seat pocket 176. The space is designed to prevent even smaller material from entering the seal area 320/327. The gap may be in the range of 0.003" or smaller.

In addition, fluid may flow past first debris ring 212 and the second debris ring 316 in the space between first debris ring 212 and the second debris ring 316 and the valve body 108 or seat 208. The first debris ring 212 or the second debris ring 316 can serve a dual role as a bearing and as a device to prevent debris from reaching seat seal 320. In some embodiments, the dynamic seat assembly 180 may have only one debris ring. In some embodiments, the first debris ring 212 and the second debris ring 316 are not perforated.

The first debris ring 212 and second debris ring 316 are configured to exclude the passage particles and debris of a certain size past the first debris ring 212 or the second debris ring 316. The minimum size of the particles excluded by the first debris ring 212 is larger than that excluded by the second debris ring 316. Therefore, the first debris ring 212 acts as a first pass particulate filter and the second debris ring 316 acts as a second pass particulate filter, which removes finer particles than are removed by the first debris ring 212. In some embodiments the first debris ring 212 prevents debris in fluids that are flowing through the through-bore 104 that are 0.063" in diameter or larger from passing the first debris ring 212. In some embodiments, the second debris ring 316 prevents debris in fluids that are flowing through the through-bore 104 that are 0.002"-0.003" in diameter from passing the second debris ring. Those skilled in the art will appreciate that other sizes of apertures may be used.

The first debris ring 212 and second debris ring 316 may be made from many materials, e.g., PEEK (polyetherether-ketone) material (or other suitable plastic) or metals. In one embodiment, the debris rings 212, 316 are made from graphite or re-enforced graphite.

The connection between the dynamic seat assembly 180 and the valve body 108 is scaled, at least in part, from fluid and gas flow by the seat seal 320. The seat seal 320 is disposed within a seat seal cavity 327, which is formed in an exterior or outer perimeter of the seat 208. When the dynamic seat assembly 180 is installed within the upstream seat pocket 172 or the downstream seat pocket 176, the seat seal 320 forms a liquid and gas tight seal to prevent or at least substantially restrict fluid and gas flow. In some embodiments, the seat seal 320 is a solid monolithic component made from resilient material. The compression of the seat seal 320 between the seat 208 of the dynamic seat assembly 180 and the valve body 108 provides a seal to prevent or reduce the flow of fluids from the through-bore 104 past the seal. In some embodiments, the seat seal 320 is a solid monolithic component and is the only component that provides a seal to prevent or reduce the flow of fluids from the through-bore 104 past the seal. In some embodiments, the solid monolithic component of the seat seal 320 has a rectangular or square cross-sectional shape as shown in FIG. 14. In some embodiments, the solid monolithic component of the seat seal 320 has a cross-sectional shape that is t-shaped as shown in FIG. 13.

The seat seal 320 can be either non-elastomeric material like polytetrafluoroethylene (PTFE), modified polytetrafluoroethylene (MPTFE), polyetheretherketone (PEEK), graphite/re-enforced graphite, or metal or a combination or made of an elastomer like that used for O-rings, e.g., hydrogenated nitrile butadiene rubber (HNBR), nitrile butadiene rubber (NBR), fluo Kohlenstoff material (FKM), perfluorelasto-mers (FFKM), etc. The seat seal 320, the first debris ring 212, and the second debris ring 316 can vary with different applications. In one embodiment, the seat seal 320 is about ¼ inch in width, 9 inches in diameter, and ⅛ inch deep.

The dynamic seat assembly 180 also may include a tooling cutout 340. The tooling cutout 340 allows for a tool to be inserted into the tooling cutout 340 for prying the dynamic seat assembly 180 from the upstream seat pocket 172 or the downstream seat pocket 176 (FIG. 14).

There are many examples of the various embodiments described herein. A number of examples also follow:

Example 1. A gate valve comprising:

a valve body, wherein the valve body is formed with a through-bore therethrough and a gate cavity and wherein the through-bore and the gate cavity intersect and are substantially orthogonal to each other;

a gate disposed within the gate cavity, wherein the gate is operable to translate along a length of the gate cavity to move between an open position and a closed position, wherein when the gate is in the closed position the gate substantially blocks fluid flow through the through-bore and when the gate is in the open position the gate does not substantially block fluid flow through the through-bore;

an annular seat pocket formed within the valve body proximate to the intersection of the through-bore and the gate cavity and concentric with the through-bore;

an annular seat disposed within the annular seat pocket, the annular seat being concentric with the through-bore, wherein a surface of the seat is in contact with a surface of the gate when the gate is in the closed position so that a substantial fluid seal is formed between the surface of the seat and the surface of the gate; and an annular skirt disposed within the gate cavity and in contact with the annular seat and in contact with the surface of the gate, wherein the annular skirt comprises an annular ring portion, the annular ring portion being concentric with the annular seat and being sized and configured so that an outer edge of the annular seat abuts with an inner edge of the annular ring portion of the annular skirt.

Example 2. The gate valve of example 1, wherein the annular seat has an outer groove, wherein the outer groove is sized and configured to receive with the inner edge of the annular ring portion of the annular skirt.

Example 3. The gate valve of example 1, further comprising a skirt energizer disposed between an interior wall of the valve body and the annular skirt for biasing the annular skirt toward the surface of the gate.

Example 4. A gate valve comprising:

a valve body, wherein the valve body is formed with a through-bore therethrough and a gate cavity and wherein the through-bore and the gate cavity intersect and are orthogonal to each other;

a gate disposed within the gate cavity, wherein the gate is operable to translate along a length of the gate cavity to move between an open position and a closed position, wherein when the gate is in the closed position the gate substantially blocks fluid flow through the through-bore and when the gate is in the open position the gate does not substantially block fluid flow through the through-bore;

a first stem disposed within the gate cavity and connected to a first end of the gate;

a second stem disposed with the gate cavity and connected to a second end of the gate;

an annular seat pocket formed within the valve body proximate to the intersection of the through-bore and the gate cavity and concentric with the through-bore;

an annular seat disposed within the annular seat pocket, the annular seat being concentric with the through-bore, wherein a surface of the seat is in contact with a surface of the gate when the gate is in the closed position so that a substantial fluid seal is formed between the surface of the seat and the surface of the gate; and a seat skirt, wherein the seat skirt has a proximate portion, a middle portion, and a distal portion, wherein the middle portion has an opening sized and configured so that an outer edge of the annular seat mates and conforms with an inner edge of the opening of the middle portion of the seat skirt, wherein the proximate portion extends into a first lubricant pocket formed within, at least partially, the valve body, and the distal portion extends into a second lubricant pocket formed within, at least partially, the valve body, and wherein the proximate portion contacts the gate to prevent substantial fluid flow between the through-bore and the first lubricant pocket and the distal portion contacts the gate to prevent substantial fluid flow between the through-bore and the second lubricant pocket.

Example 5. The gate valve of example 4, wherein the annular seat has an outer groove, wherein the outer groove is sized to receive and mate with the inner edge of the annular ring portion of the annular skirt.

Example 6. The gate valve of claim 5, further comprising a skirt energizer disposed between a wall of the valve body and the annular skirt for biasing the annular skirt toward the surface of the gate.

Example 7. A slab gate valve comprising:

a valve body formed with a through-bore in a first direction and formed with a gate cavity in a second direction orthogonal to the first direction;

a slab gate having a first portion and a second portion;

wherein the gate cavity is sized and configured to receive the slab gate;

wherein the first portion of the slab gate is sized and configured to occlude the through-bore when the slab gate is in a closed position;

wherein the second portion of the slab gate is formed with a flow aperture for allowing flow therethrough when the slab gate is in an open position;

at least one stem coupled to the slab gate for selectively moving the slab gate between the open position and the closed position;

a seat at least partially disposed within a seat pocket formed in the valve body proximate to an intersection of the through-bore and the gate cavity, wherein a side of the seat contacts a side of the gate when the slab gate is in the closed position to form a substantial fluid seal between the seat and the gate.

a downstroke lubricant cavity formed in a portion of the valve body; and a concentric skirt disposed adjacent to the slab gate and at least between the slab gate and the downstroke lubricant cavity, wherein the concentric skirt has an opening sized and configured to receive outer edge of the seat whereby the concentric skirt is suspended within the gate cavity by the seat.

Example 8. The gate valve of example 7, wherein the annular seat has an outer groove and wherein the outer groove is sized to receive the inner edge of the annular ring portion of the annular skirt.

Example 9. The gate valve of example 7, further comprising a skirt energizer disposed between a wall of the valve body and the annular skirt for biasing the annular skirt toward the surface of the gate.

Although the present disclosure and its advantages have been disclosed in the context of certain illustrative, non-limiting embodiments, it should be understood that various changes, substitutions, permutations, and alterations can be made without departing from the scope of the disclosure as defined by the claims. It will be appreciated that any feature that is described in a connection to any one embodiment may also be applicable to any other embodiment.

What is claimed:

1. A gate valve comprising:

a valve body, wherein the valve body is formed with a through-bore and a gate cavity therethrough and wherein the through-bore and the gate cavity intersect and are substantially orthogonal to each other;

a gate disposed within the gate cavity, wherein the gate is operable to translate along a length of the gate cavity to move between an open position and a closed position, wherein when the gate is in the closed position the gate substantially blocks fluid flow through the through-bore and when the gate is in the open position the gate does not substantially block fluid flow through the through-bore;

an annular seat pocket formed within the valve body proximate to the intersection of the through-bore and the gate cavity and concentric with the through-bore;

an annular seat disposed within the annular seat pocket, the annular seat being concentric with the through-bore, wherein a surface of the seat is in contact with a surface of the gate when the gate is in the closed position so that a substantial fluid seal is formed between the surface of the seat and the surface of the gate; and a skirt disposed within the gate cavity and in contact with the annular seat and in contact with the surface of the gate, wherein the skirt comprises an annular ring portion, the annular ring portion having an annular opening that is concentric with the annular seat and is sized and configured so that an outer edge of the annular seat abuts with an inner edge of the annular opening.

2. The gate valve of claim 1, wherein the annular seat has an outer groove, wherein the outer groove is sized and configured to receive the inner edge of the annular opening of the annular skirt.

3. The gate valve of claim 1, further comprising at least one skirt energizer disposed between an interior wall of the valve body and the skirt for biasing the skirt toward the surface of the gate.

4. The gate valve of claim 3, wherein the at least one skirt energizer comprises a cantilever spring.

5. The gate valve of claim 3, wherein the at least one skirt energizer comprises three skirt energizers.

6. The gate valve of claim 1, further comprising:

a dynamic seat assembly, wherein the dynamic seat assemble comprises the annular seat and a seat energizer disposed within a seat energizer cavity of the annular seat; and wherein the seat energizer provides a biasing force to urge the annular seat toward the gate.

7. The gate valve of claim 6, further comprising:

at least one skirt energizer disposed between an interior wall of the valve body and the skirt for biasing the skirt toward the surface of the gate; and wherein the at least one skirt energizer and the seat energizer are not the same energizer.

8. A gate valve comprising:

a valve body, wherein the valve body is formed with a through-bore therethrough and a gate cavity and wherein the through-bore and the gate cavity intersect and are orthogonal to each other;

a gate disposed within the gate cavity, wherein the gate is operable to translate along a length of the gate cavity to move between an open position and a closed position, wherein when the gate is in the closed position the gate substantially blocks fluid flow through the through-bore and when the gate is in the open position the gate does not substantially block fluid flow through the through-bore;

a first stem disposed within the gate cavity and connected to a first end of the gate;

a second stem disposed with the gate cavity and connected to a second end of the gate;

an annular seat pocket formed within the valve body proximate to an intersection of the through-bore and the gate cavity and concentric with the through-bore;

an annular seat disposed within the annular seat pocket, the annular seat being concentric with the through-bore, wherein a surface of the annular seat is in contact with a surface of the gate when the gate is in the closed position so that a substantial fluid seal is formed between the surface of the annular seat and the surface of the gate; and a skirt, wherein the skirt has a proximate portion, a middle portion, and a distal portion, wherein the middle portion has an opening sized and configured so that an outer edge of the annular seat mates and conforms with an inner edge of the opening of the middle portion of the skirt, wherein the proximate portion extends into a first lubricant pocket formed within the valve body, and the distal portion extends into a second lubricant pocket formed within the valve body, and wherein, when the gate is in the closed position, the distal portion contacts the gate to substantially prevent fluid flow between an opening in the gate and the second lubricant pocket.

9. The gate valve of claim 8, wherein the annular seat has an outer groove; and the skirt is partially disposed within the outer groove of the annular seat.

10. The gate valve of claim 8, further comprising at least one skirt energizer coupled to the skirt and disposed between a wall of the valve body and the skirt for biasing the skirt toward the surface of the gate.

11. The gate valve of claim 10, wherein the at least one skirt energizer comprises a cantilever spring.

12. The gate valve of claim 10, wherein the at least one skirt energizer comprises three skirt energizers.

13. The gate valve of claim 10, further comprising:

a dynamic seat assembly;

wherein the dynamic seat assemble comprises the annular seat and a seat energizer disposed within a seat energizer cavity of the annular seat;

wherein the seat energizer provides a biasing force to urge the annular seat toward the gate; and wherein the at least one skirt energizer and the seat energizer are not the same energizer.

14. A slab gate valve comprising:

a valve body formed with a through-bore in a first direction and formed with a gate cavity in a second direction orthogonal to the first direction;

a slab gate having a first portion and a second portion;

wherein the gate cavity is sized and configured to receive the slab gate;

wherein the first portion of the slab gate is sized and configured to occlude the through-bore when the slab gate is in a closed position;

wherein the second portion of the slab gate is formed with a flow aperture for allowing flow therethrough when the slab gate is in an open position;

at least one stem coupled to the slab gate for selectively moving the slab gate between the open position and the closed position;

a seat at least partially disposed within a seat pocket formed in the valve body proximate to an intersection of the through-bore and the gate cavity, wherein a side of the seat contacts a side of the gate when the slab gate is in the closed position to form a substantial fluid seal between the seat and the gate;

a downstroke lubricant cavity formed in a portion of the valve body; and a skirt disposed adjacent to the slab gate and at least partially between the slab gate and the downstroke lubricant cavity, wherein the skirt has an opening sized and configured to receive an outer edge of the seat whereby the skirt is suspended within the gate cavity by the seat.

15. The gate valve of claim 14, wherein the seat has an outer groove; and the skirt is partially disposed within the outer groove of the seat.

16. The gate valve of claim 15, further comprising at least one skirt energizer disposed between a wall of the valve body and the skirt for biasing the skirt toward the surface of the gate.

17. The gate valve of claim 16, wherein the at least one skirt energizer comprises a cantilever spring.

18. The gate valve of claim 16, wherein the at least one skirt energizer comprises three skirt energizers.

19. The gate valve of claim 14, further comprising:

a dynamic seat assembly, wherein the dynamic seat assemble comprises the seat and a seat energizer disposed within a seat energizer cavity of the seat; and wherein the seat energizer provides a biasing force to urge the seat toward the gate.

20. The gate valve of claim 19, further comprising:

further comprising at least one skirt energizer disposed between an interior wall of the valve body and the skirt for biasing the skirt toward the surface of the gate; and wherein the at least one skirt energizer and the seat energizer are not the same energizer.

* * * * *